United States Patent
Allahverdiyev et al.

(10) Patent No.: US 11,567,939 B2
(45) Date of Patent: *Jan. 31, 2023

(54) LAZY REASSEMBLING OF SEMI-STRUCTURED DATA

(71) Applicant: Snowflake Inc., Bozeman, MT (US)

(72) Inventors: Mahmud Allahverdiyev, Berlin (DE); Selcuk Aya, San Carlos, CA (US); Bowei Chen, San Bruno, CA (US); Ismail Oukid, Berlin (DE)

(73) Assignee: Snowflake Inc., Bozeman, MT (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/814,110

(22) Filed: Jul. 21, 2022

(65) Prior Publication Data
US 2022/0358128 A1 Nov. 10, 2022

Related U.S. Application Data

(63) Continuation-in-part of application No. 17/655,124, filed on Mar. 16, 2022, which is a continuation of
(Continued)

(51) Int. Cl.
*G06F 16/24* (2019.01)
*G06F 16/2455* (2019.01)
(Continued)

(52) U.S. Cl.
CPC .... *G06F 16/24557* (2019.01); *G06F 16/2272* (2019.01); *G06F 16/283* (2019.01); *G06F 16/9035* (2019.01); *G06F 17/18* (2013.01)

(58) Field of Classification Search
CPC .......... G06F 16/24557; G06F 16/2272; G06F 16/9035; G06F 16/283; G06F 17/18; G06F 16/248; G06F 16/903
See application file for complete search history.

(56) References Cited

U.S. PATENT DOCUMENTS

| 6,154,572 A | 11/2000 | Chaddha |
| 6,374,232 B1 | 4/2002 | Dageville et al. |
(Continued)

FOREIGN PATENT DOCUMENTS

| CN | 113051351 A | 6/2021 |
| EP | 2434417 A1 | 3/2012 |
(Continued)

OTHER PUBLICATIONS

US 11,397,751 B2, 07/2022, Chu et al. (withdrawn)
(Continued)

*Primary Examiner* — Merilyn P Nguyen
(74) *Attorney, Agent, or Firm* — Schwegman Lundberg & Woessner, P.A.

(57) ABSTRACT

A pruning index is generated for a source table organized into a set of batch units. The source table comprises a column of semi-structured data. The pruning index comprises a set of filters that index distinct values in each column of the source table. Rather than reassembling an entire tree structure of the semi-structured data prior to indexing, the generating of the pruning index comprises traversing a reassembly hook object that represents a first portion of the semi-structured data that is subcolumnarized and traversing a residual object that represents a second portion of the semi-structured data that is not subcolumnarized. The reassembly hook object is traversed to identify values corresponding to the first portion of the semi-structured data and the residual object is traversed to identify values corresponding to the second portion. The pruning index is stored with an association with the source table.

30 Claims, 15 Drawing Sheets

Related U.S. Application Data application No. 17/394,149, filed on Aug. 4, 2021, now Pat. No. 11,308,090, which is a continuation-in-part of application No. 17/358,154, filed on Jun. 25, 2021, now Pat. No. 11,308,089, which is a continuation of application No. 17/161,115, filed on Jan. 28, 2021, now Pat. No. 11,086,875, which is a continuation of application No. 16/932,462, filed on Jul. 17, 2020, now Pat. No. 10,942,925, which is a continuation of application No. 16/727,315, filed on Dec. 26, 2019, now Pat. No. 10,769,150.

(60) Provisional application No. 63/197,750, filed on Jun. 7, 2021.

(51) Int. Cl.
  *G06F 16/9035* (2019.01)
  *G06F 16/28* (2019.01)
  *G06F 17/18* (2006.01)
  *G06F 16/22* (2019.01)

(56) References Cited

U.S. PATENT DOCUMENTS

| | | | |
|---|---|---|---|
| 6,571,233 B2 | 5/2003 | Beavin et al. | |
| 6,957,225 B1 | 10/2005 | Zait et al. | |
| 7,171,427 B2 | 1/2007 | Witkowski et al. | |
| 7,814,104 B2 | 10/2010 | Raghavan et al. | |
| 7,970,756 B2 | 6/2011 | Beavin et al. | |
| 8,458,156 B1 | 6/2013 | Sharifi et al. | |
| 8,631,028 B1* | 1/2014 | Pettovello | G06F 16/8373 |
| | | | 707/765 |
| 8,666,976 B2 | 3/2014 | Merz | |
| 8,825,678 B2 | 9/2014 | Potapov et al. | |
| 9,223,850 B2 | 12/2015 | Chen | |
| 9,471,711 B2 | 10/2016 | Abadi et al. | |
| 9,507,825 B2 | 11/2016 | Baer et al. | |
| 9,514,187 B2 | 12/2016 | Ziauddin | |
| 10,025,823 B2 | 7/2018 | Das et al. | |
| 10,311,062 B2 | 6/2019 | McPherson et al. | |
| 10,528,599 B1 | 1/2020 | Pandis et al. | |
| 10,628,418 B2 | 4/2020 | Weyerhaeuser et al. | |
| 10,649,991 B2 | 5/2020 | Finlay et al. | |
| 10,685,052 B2 | 6/2020 | Winther | |
| 10,705,809 B2 | 7/2020 | Makkar | |
| 10,713,243 B2 | 7/2020 | Mathur | |
| 10,769,150 B1 | 9/2020 | Cruanes et al. | |
| 10,776,355 B1* | 9/2020 | Batsakis | G06F 16/2471 |
| 10,812,495 B2 | 10/2020 | Traore et al. | |
| 10,838,963 B2 | 11/2020 | Brodt et al. | |
| 10,860,832 B2 | 12/2020 | Wang | |
| 10,901,948 B2 | 1/2021 | Ackerman et al. | |
| 10,942,925 B1 | 3/2021 | Cruanes et al. | |
| 10,997,179 B1 | 5/2021 | Cruanes et al. | |
| 11,016,975 B1 | 5/2021 | Cruanes et al. | |
| 11,037,258 B2 | 6/2021 | Brenner et al. | |
| 11,042,650 B2 | 6/2021 | Fu et al. | |
| 11,086,875 B2 | 8/2021 | Cruanes et al. | |
| 11,093,518 B1* | 8/2021 | Lu | G06F 11/3476 |
| 11,113,286 B2 | 9/2021 | Cruanes et al. | |
| 11,163,745 B2 | 11/2021 | Coleman et al. | |
| 11,194,793 B1 | 12/2021 | Srivastava et al. | |
| 11,238,049 B1* | 2/2022 | James | G06F 16/24573 |
| 11,269,939 B1* | 3/2022 | Sammer | H04L 67/55 |
| 11,308,089 B2 | 4/2022 | Cruanes et al. | |
| 11,308,090 B2 | 4/2022 | Allahverdiyev et al. | |
| 11,334,543 B1* | 5/2022 | Anwar | G06F 16/254 |
| 2004/0243816 A1 | 12/2004 | Hacigumus et al. | |
| 2005/0022115 A1* | 1/2005 | Baumgartner | G06F 16/9535 |
| | | | 715/205 |
| 2005/0198076 A1 | 9/2005 | Stata et al. | |
| 2009/0070303 A1 | 3/2009 | Beavin et al. | |
| 2010/0125594 A1 | 5/2010 | Li et al. | |
| 2010/0281017 A1 | 11/2010 | Hu et al. | |
| 2010/0318519 A1 | 12/2010 | Hadjieleftheriou et al. | |
| 2011/0179085 A1* | 7/2011 | Hammerschmidt | G06F 16/81 |
| | | | 707/E17.012 |
| 2011/0213775 A1 | 9/2011 | Franke et al. | |
| 2012/0109888 A1 | 5/2012 | Zhang et al. | |
| 2013/0166553 A1 | 6/2013 | Yoon et al. | |
| 2013/0166557 A1 | 6/2013 | Fricke et al. | |
| 2014/0114942 A1 | 4/2014 | Belakovskiy et al. | |
| 2014/0365424 A1 | 12/2014 | Herbst et al. | |
| 2015/0134670 A1 | 5/2015 | Liu et al. | |
| 2015/0234931 A1* | 8/2015 | Dageville | H04L 67/1097 |
| | | | 707/738 |
| 2015/0286681 A1 | 10/2015 | Baer et al. | |
| 2016/0026667 A1 | 1/2016 | Mukherjee et al. | |
| 2016/0055220 A1* | 2/2016 | Joshi | G06F 16/319 |
| | | | 707/722 |
| 2016/0162364 A1 | 6/2016 | Mutha et al. | |
| 2016/0188623 A1 | 6/2016 | Finlay et al. | |
| 2016/0292201 A1 | 10/2016 | Asaad et al. | |
| 2016/0350347 A1 | 12/2016 | Das et al. | |
| 2016/0350392 A1 | 12/2016 | Rice et al. | |
| 2017/0060944 A1 | 3/2017 | Khayyat et al. | |
| 2017/0116136 A1 | 4/2017 | Macnicol et al. | |
| 2017/0116271 A1 | 4/2017 | Ziauddin et al. | |
| 2017/0139989 A1 | 5/2017 | Weyerhaeuser et al. | |
| 2017/0220652 A1 | 8/2017 | Kazi et al. | |
| 2017/0300862 A1 | 10/2017 | Bhadouria et al. | |
| 2018/0068008 A1 | 3/2018 | Cruanes et al. | |
| 2018/0101540 A1 | 4/2018 | Stoop et al. | |
| 2018/0113889 A1 | 4/2018 | Brodt | |
| 2018/0336263 A1 | 11/2018 | Bensberg et al. | |
| 2018/0357262 A1 | 12/2018 | He et al. | |
| 2019/0130250 A1 | 5/2019 | Park et al. | |
| 2019/0205376 A1 | 7/2019 | Merhav et al. | |
| 2019/0220464 A1 | 7/2019 | Butani | |
| 2019/0294719 A1* | 9/2019 | Beringer | G06F 16/2465 |
| 2019/0303270 A1 | 10/2019 | Hoermann | |
| 2019/0332722 A1 | 10/2019 | Ogren et al. | |
| 2020/0026788 A1 | 1/2020 | Bellamkonda et al. | |
| 2020/0210398 A1* | 7/2020 | Liu | G06F 16/284 |
| 2020/0373946 A1 | 11/2020 | Lee et al. | |
| 2021/0073219 A1 | 3/2021 | Barbas et al. | |
| 2021/0200772 A1 | 7/2021 | Cruanes et al. | |
| 2021/0200894 A1* | 7/2021 | Bastide | G06F 16/254 |
| 2021/0216555 A1 | 7/2021 | Cruanes et al. | |
| 2021/0319025 A1 | 10/2021 | Cruanes et al. | |
| 2021/0357411 A1 | 11/2021 | Cruanes et al. | |
| 2021/0365461 A1 | 11/2021 | Allahverdiyev et al. | |
| 2021/0397619 A1 | 12/2021 | Heimel et al. | |
| 2022/0207041 A1 | 6/2022 | Allahverdiyev et al. | |
| 2022/0261228 A1* | 8/2022 | Schneuwly | G06F 8/427 |

FOREIGN PATENT DOCUMENTS

| | | |
|---|---|---|
| WO | WO-2021/133433 A1 | 7/2021 |
| WO | WO-2022/016170 A1 | 1/2022 |

OTHER PUBLICATIONS

"U.S. Appl. No. 16/727,315, Examiner Interview Summary dated Jun. 2, 2020", 3 pgs.

"U.S. Appl. No. 16/727,315, Non Final Office Action dated Mar. 2, 2020", 12 pgs.

"U.S. Appl. No. 16/727,315, Notice of Allowance dated Jun. 8, 2020", 9 pgs.

"U.S. Appl. No. 16/727,315, Response Filed May 27, 2020 to Non Final Office Action dated Mar. 2, 2020", 14 pgs.

"U.S. Appl. No. 16/932,462, Examiner Interview Summary dated Nov. 25, 2020", 3 pgs.

"U.S. Appl. No. 16/932,462, Non Final Office Action dated Aug. 21, 2020", 11 pgs.

"U.S. Appl. No. 16/932,462, Notice of Allowance dated Dec. 15, 2020", 9 pgs.

"U.S. Appl. No. 16/932,462, Response filed Nov. 23, 2020 to Non Final Office Action dated Aug. 21, 2020", 12 pgs.

(56) References Cited

OTHER PUBLICATIONS

"U.S. Appl. No. 17/086,228, Non Final Office Action dated Dec. 28, 2020", 12 pgs.
"U.S. Appl. No. 17/086,228, Notice of Allowance dated Jan. 22, 2021", 7 pgs.
"U.S. Appl. No. 17/086,228, Response filed Jan. 4, 2021 to Non Final Office Action dated Dec. 28, 2020", 8 pgs.
"U.S. Appl. No. 17/086,239, Non Final Office Action dated Dec. 17, 2020", 15 pgs.
"U.S. Appl. No. 17/086,239, Notice of Allowance dated Apr. 9, 2021", 15 pgs.
"U.S. Appl. No. 17/086,239, Response filed Mar. 17, 2021 to Non Final Office Action dated Dec. 17, 2020", 12 pgs.
"U.S. Appl. No. 17/161,115, Corrected Notice of Allowability dated Jun. 24, 2021", 2 pgs.
"U.S. Appl. No. 17/161,115, Final Office Action dated Apr. 28, 2021", 17 pgs.
"U.S. Appl. No. 17/161,115, Non Final Office Action dated Mar. 23, 2021", 19 pgs.
"U.S. Appl. No. 17/161,115, Notice of Allowance dated May 12, 2021", 8 pgs.
"U.S. Appl. No. 17/161,115, Response filed Apr. 15, 2021 to Non Final Office Action dated Mar. 23, 2021", 12 pgs.
"U.S. Appl. No. 17/161,115, Response filed Apr. 30, 2021 to Final Office Action dated Apr. 28, 2021", 8 pgs.
"U.S. Appl. No. 17/218,962, Corrected Notice of Allowability dated Jul. 12, 2021", 2 pgs.
"U.S. Appl. No. 17/218,962, Non Final Office Action dated Jun. 4, 2021", 21 pgs.
"U.S. Appl. No. 17/218,962, Notice of Allowance dated Jul. 2, 2021", 8 pgs.
"U.S. Appl. No. 17/218,962, Response filed Jun. 10, 2021 to Non Final Office Action dated Jun. 4, 2021", 9 pgs.
"U.S. Appl. No. 17/358,154, Corrected Notice of Allowability dated Mar. 2, 2022", 2 pgs.
"U.S. Appl. No. 17/358,154, Non Final Office Action dated Oct. 20, 2021", 24 pgs.
"U.S. Appl. No. 17/358,154, Notice of Allowance dated Feb. 14, 2022", 9 pgs.
"U.S. Appl. No. 17/358,154, Response filed Jan. 17, 2022 to Non Final Office Action dated Oct. 20, 2021", 11 pgs.
"U.S. Appl. No. 17/388,160, Non Final Office Action dated Dec. 6, 2021", 24 pgs.
"U.S. Appl. No. 17/388,160, Notice of Allowance dated Mar. 2, 2022", 10 pgs.
"U.S. Appl. No. 17/388,160, Response filed Jan. 28, 2022 to Non Final Office Action dated Dec. 6, 2021", 10 pgs.
"U.S. Appl. No. 17/394,149, Non Final Office Action dated Dec. 13, 2021", 18 pgs.
"U.S. Appl. No. 17/394,149, Notice of Allowance dated Feb. 18, 2022", 9 pgs.
"U.S. Appl. No. 17/394,149, Response filed Jan. 28, 2022 to Non Final Office Action dated Dec. 13, 2021", 10 pgs.
"U.S. Appl. No. 17/462,796, Examiner Interview Summary dated Mar. 22, 2022", 2 pgs.
"U.S. Appl. No. 17/462,796, Non Final Office Action dated Dec. 21, 2021", 18 pgs.
"U.S. Appl. No. 17/462,796, Response filed Mar. 21, 2022 to Non Final Office Action dated Dec. 21, 2021", 12 pgs.
"U.S. Appl. No. 17/655,124, Non Final Office Action dated May 4, 2022", 14 pgs.
"U.S. Appl. No. 17/655,124, Response filed Jul. 19, 2022 to Non Final Office Action dated May 4, 2022", 10 pgs.
"European Application Serial No. 20216097.4, Extended European Search Report dated May 20, 2021", 7 pgs.
"European Application Serial No. 20216097.4, Response filed Dec. 22, 2021 to Extended European Search Report dated May 20, 2021", 32 pgs.
"Indian Application Serial No. 202044053756, First Examination Report dated Dec. 21, 2021", 6 pgs.
"International Application Serial No. PCT/US2020/044199, International Search Report dated Aug. 26, 2020", 2 pgs.
"International Application Serial No. PCT/US2020/044199, Written Opinion dated Aug. 26, 2020", 6 pgs.
"International Application Serial No. PCT/US2021/070808, International Search Report dated Jul. 26, 2021", 2 pgs.
"International Application Serial No. PCT/US2021/070808, Written Opinion dated Jul. 26, 2021", 3 pgs.
U.S. Appl. No. 16/727,315 U.S. Pat. No. 10,769,150, filed Dec. 26, 2019, Pruning Indexes to Enhance Database Query Processing.
U.S. Appl. No. 16/932,462 U.S. Pat. No. 10,942,925, filed Jul. 17, 2020, Database Query Processing Using a Pruning Index.
U.S. Appl. No. 17/161,115 U.S. Pat. No. 11,086,875, filed Jan. 28, 2021, Database Query Processing Using a Pruning Index.
U.S. Appl. No. 14/394,149 U.S. Pat. No. 11,308,090, filed Aug. 4, 2021, Pruning Index to Support Semi-Structured Data Types.
U.S. Appl. No. 17/358,154 U.S. Pat. No. 11,308,089, filed Jun. 25, 2021, Pruning Index Maintenance.
U.S. Appl. No. 17/655,124, filed Mar. 16, 2022, Processing Queries on Semi-Structured Data Columns.
"U.S. Appl. No. 17/655,124, Notice of Allowance dated Aug. 3, 2022", 9 pgs.

* cited by examiner

| PARTITION# | ... | BLOOM[0] (8 BYTES) | ... | BLOOM[N] (8 BYTES) |
|---|---|---|---|---|
| P000 | ... | 00101 | | 0101 |
| P002 | ... | 10010 | | 1310 |
| ... | ... | | | |
| P1001 | ... | 00101 | | 0013 |
| P1001 | ... | 10010 | | 1300 |

LAZY REASSEMBLING OF SEMI-STRUCTURED DATA

PRIORITY CLAIM

This application is a continuation-in-part of U.S. patent application Ser. No. 17/655,124, entitled "PROCESSING QUERIES ON SEMI-STRUCTURED DATA COLUMNS," filed Mar. 16, 2022, which is a continuation of U.S. Pat. No. 11,308,090, entitled "PRUNING INDEX TO SUPPORT SEMI-STRUCTURED DATA TYPES," filed Aug. 4, 2021, which claims priority to U.S. Provisional Patent Application No. 63/197,750 filed on Jun. 7, 2021 and is a continuation-in-part of U.S. Pat. No. 11,308,089, entitled "PRUNING INDEX MAINTENANCE," filed Jun. 25, 2021, which is a continuation of U.S. Pat. No. 11,086,875, entitled "DATABASE QUERY PROCESSING USING A PRUNING INDEX," which is a continuation of U.S. Pat. No. 10,942,925, entitled "DATABASE QUERY PROCESSING USING A PRUNING INDEX," filed on Jul. 17, 2020, which is a continuation of U.S. Pat. No. 10,769,150, entitled "PRUNING INDEXES TO ENHANCE DATABASE QUERY PROCESSING," filed on Dec. 26, 2019, all of which are incorporated herein by reference in their entirety.

TECHNICAL FIELD

Embodiments of the disclosure relate generally to databases and, more specifically, to lazy reassembling of semi-structured data in a database system.

BACKGROUND

When certain information is to be extracted from a database, a query statement may be executed against the database data. A database system processes the query and returns certain data according to one or more search conditions that indicate what information should be returned by the query. The database system extracts specific data from the database and formats that data into a readable form. However, it can be challenging to execute queries on a very large table because a significant amount of time and computing resources are required to scan an entire table to identify data that satisfies the query.

BRIEF DESCRIPTION OF THE DRAWINGS

The present disclosure will be understood more fully from the detailed description given below and from the accompanying drawings of various embodiments of the disclosure.

FIG. 5 illustrates a portion of an example pruning index, in accordance with some embodiments of the present disclosure.

DETAILED DESCRIPTION

Figure 1:
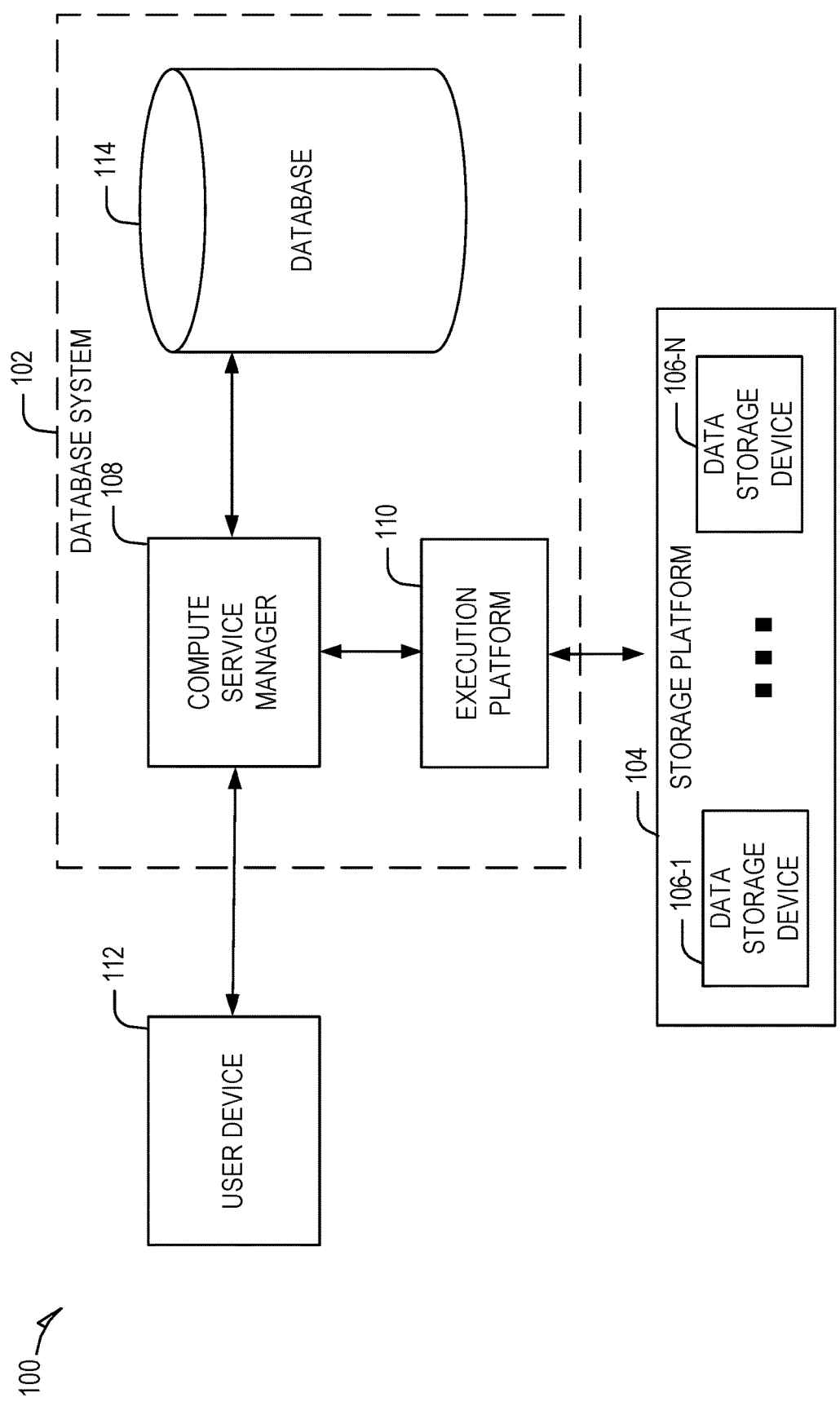
FIG. 1 illustrates an example computing environment that includes a network-based database system in communication with a cloud storage provider system, in accordance with some embodiments of the present disclosure.

Reference will now be made in detail to specific example embodiments for carrying out the inventive subject matter. Examples of these specific embodiments are illustrated in the accompanying drawings, and specific details are set forth in the following description in order to provide a thorough understanding of the subject matter. It will be understood that these examples are not intended to limit the scope of the claims to the illustrated embodiments. On the contrary, they are intended to cover such alternatives, modifications, and equivalents as may be included within the scope of the disclosure.

As noted above, processing queries directed to very large tables is challenging because a significant amount of time and computing resources are required to scan an entire table to identify data that satisfies the query. Therefore, it can be desirable to execute a query without scanning the entire table. Aspects of the present disclosure address the above and other challenges in processing queries on large tables by creating a pruning index that may be used to construct a reduced scan set for processing a query. More specifically, a large source table may be organized into a set of batch units such as micro-partitions, and a pruning index can be created for the source table to be used in identifying a subset of the batch units to scan to identify data that satisfies the query.

It is common for data to be stored by database systems in semi-structured formats, which can store objects of any kind such as numbers, strings, timestamps, or the like. Accordingly, the pruning indexes described herein are configured to support primitive data types (e.g., STRING, NUMBER, or the like) as well as such semi-structured and complex (e.g., ARRAY and OBJECT) data types.

Consistent with some embodiments, a network-based database system generates a pruning index for a source table and uses the pruning index to prune micro-partitions of the source table when processing queries directed to the source table. The pruning index includes a probabilistic data structure that stores fingerprints for all searchable values in a source table. The fingerprints are based on hashes computed based on searchable values in the source table. To support semi-structured data type values, hashes can be computed over indexing transformations of searchable values. That is, for each semi-structured data type value, one or more indexing transformations are generated and the fingerprints are generated based on hashes computed over the one or more indexing transformations. An indexing transformation is generated by converting a semi-structured data value to a primitive data type. Semi-structured data types are automatically parsed to identify all paths that can be indexed. To support partial matching queries, fingerprints can be generated by computing a hash over a set of N-grams generated based on a searchable value, in some embodiments.

In generating a pruning index, the network-based database system uses the fingerprints to generate a filter for each micro-partition of the source table that indexes distinct values (or distinct N-grams of searchable values) in each column of the micro-partition of the source table. The filter may, for example, comprise a blocked bloom filter, a bloom filter, a hash filter, or a cuckoo filter.

For a given query, the pruning index can be used to quickly disqualify micro-partitions that are certain to not include data that satisfies the query. When a query is received, rather than scanning the entire source table to identify matching data, the network-based database system probes the pruning index to identify a reduced scan set of micro-partitions comprising only a subset of the micro-partitions of the source table, and only the reduced scan set of micro-partitions is scanned when executing the query.

The database system can use a pruning index to prune a scan set for queries with equality predicates (e.g., "=") and queries with pattern matching predicates (e.g., LIKE, ILIKE, CONTAINS, STARTSWITH, ENDSWITH, RLIKE, REGEXP, etc.) on both structured and semi-structured data types. As discussed herein, a "predicate" comprises an expression (e.g., a SQL expression) that evaluates a search condition that is either TRUE, FALSE, or UNKNOWN. For a given equality predicate, the database system uses the pruning index to identify a subset of micro-partitions to scan for data that matches an entire string or other searchable value. For a given pattern matching predicate, the database system uses the pruning index to identify a set of micro-partitions to scan for data that matches a specified search pattern, which can include one or more partial strings and one or more wildcards (e.g., "%" or "_") used to represent wildcard character positions in the pattern (e.g., character positions whose underlying value is unconstrained by the query).

By using a pruning index to prune the set of micro-partitions to scan in executing a query, the database system accelerates the execution of point queries on large tables when compared to conventional methodologies. Using a pruning index in this manner also guarantees a constant overhead for every searchable value on the table. Additional benefits of pruning index utilization include, but are not limited to, an ability to support multiple predicate types, an ability to quickly compute the number of distinct values in a table, and the ability to support join pruning.

In addition, by utilizing indexing transformations when building the pruning index, query predicates on semi-structured fields can be supported. Contrary to conventional approaches, this approach does not require manual selection of semi-structured data fields to be indexed. Further, unlike conventional approaches, this approach does not use any additional storage or concepts such as virtual columns or generated columns to store the fields to be indexed. Also, the pruning indexes described herein support indexing and matching against predicates regardless of how nested or evolving the structure of the input data is. Moreover, this approach does not enforce any data type restrictions on the semi-structured data fields and the values in the predicate. Finally, the generation of the pruning index involves cast-sensitive indexing of individual semi-structured data type fields, meaning that each input record can be attempted to be converted to relevant data types to match with casting behavior of semi-structured data type columns.

When building a pruning index on a semi-structured data column, a lazy reassembly process may be used rather than reassembling an entire tree structure for the semi-structured data column prior to indexing. For some embodiments, when ingesting semi-structured data from a column of a source table, the database system subcolumnarizes a first portion of the semi-structured data based on a set of rules. As used herein, "subcolumnarization" refers to storing semi-structured data in a columnar form within a column based on a set of rules. Accordingly, the database system extracts the first portion to a columnar form within the column based on the set of rules. The database system generates a reassembly hook object for the semi-structured data that includes information about the subcolumnarized data. The reassembly hook object comprises a data structure such as a tree structure that represents the first portion of semi-structured data. For example, the first portion of semi-structured data can include a first subcolumnarized path and a second subcolumnarized path. In this example, the reassembly hook object includes a root node with a first branch corresponding to the first subcolumnarized path and a second branch corresponding to the second subcolumnarized path. The first branch includes a first leaf node with a pointer to records (primitive values) at the first subcolumnarized path and the second branch includes a second leaf node with a pointer to primitive values for the second subcolumnarized path.

In addition to the reassembly hook object, one or more residual data objects are generated. The one or more residual data objects represent the second portion of the semi-structured data that is not subcolumnarized. In building the pruning index for the semi-structured data column in the source table, the database system traverses the reassembly hook object and the one or more residual objects to identify values for indexing, rather than reassembling the entire tree structure for the semi-structured column prior to indexing.

By incorporating the lazy reassembly technique for indexing semi-structured data referenced above and described herein, the database system eliminates a need for indexer instances to traverse entire semi-structured data trees for every row in a base table. This approach also improves data locality. Moreover, when subcolumn entries are dictionary encoded, the database system is able to perform memoization on top of the dictionary values such that every distinct value gets traversed and indexed only once. Further, the lazy reassembly approach leads to faster index build performance. In addition, when attempting to reinsert semi-structured data into a materialized table or ingesting it from a column-oriented data storage format such as PARQUET, leaving the data in lazily reassembled format and doing subcolumnarization in the insert path of the lazily reassembled data is more efficient.

As discussed herein, a "micro-partition" is a batch unit, and each micro-partition has contiguous units of storage. By way of example, each micro-partition may contain between 50 MB and 500 MB of uncompressed data (note that the actual size in storage may be smaller because data may be stored compressed). Groups of rows in tables may be mapped into individual micro-partitions organized in a columnar fashion. This size and structure allow for extremely granular selection of the micro-partitions to be scanned, which can comprise millions, or even hundreds of millions, of micro-partitions. This granular selection process for micro-partitions to be scanned is referred to herein as "pruning." Pruning involves using metadata to determine which portions of a table, including which micro-partitions or micro-partition groupings in the table, are not pertinent to a query, and then avoiding those non-pertinent micro-partitions when responding to the query and scanning only the pertinent micro-partitions to respond to the query. Metadata may be automatically gathered about all rows stored in a micro-partition, including: the range of values for each of the columns in the micro-partition; the number of distinct values; and/or additional properties used for both optimization and efficient query processing. In one embodiment, micro-partitioning may be automatically performed on all tables. For example, tables may be transparently partitioned using the ordering that occurs when the data is inserted/loaded. However, it should be appreciated that this disclosure of the micro-partition is exemplary only and should be considered non-limiting. It should be appreciated that the micro-partition may include other database storage devices without departing from the scope of the disclosure.

FIG. 1 illustrates an example computing environment 100 that includes a database system 102 in communication with a storage platform 104, in accordance with some embodiments of the present disclosure. To avoid obscuring the inventive subject matter with unnecessary detail, various functional components that are not germane to conveying an understanding of the inventive subject matter have been omitted from FIG. 1. However, a skilled artisan will readily recognize that various additional functional components may be included as part of the computing environment 100 to facilitate additional functionality that is not specifically described herein.

As shown, the computing environment 100 comprises the database system 102 and a storage platform 104 (e.g., AWS®, Microsoft Azure Blob Storage®, or Google Cloud Storage®). The database system 102 is used for reporting and analysis of integrated data from one or more disparate sources including storage devices 106-1 to 106-N within the storage platform 104. The storage platform 104 comprises a plurality of computing machines and provides on-demand computer system resources such as data storage and computing power to the database system 102.

The database system 102 comprises a compute service manager 108, an execution platform 110, and a database 114. The database system 102 hosts and provides data reporting and analysis services to multiple client accounts. Administrative users can create and manage identities (e.g., users, roles, and groups) and use permissions to allow or deny access to the identities to resources and services.

The compute service manager 108 coordinates and manages operations of the database system 102. The compute service manager 108 also performs query optimization and compilation as well as managing clusters of compute services that provide compute resources (also referred to as "virtual warehouses"). The compute service manager 108 can support any number of client accounts such as end users providing data storage and retrieval requests, system administrators managing the systems and methods described herein, and other components/devices that interact with compute service manager 108.

The compute service manager 108 is also in communication with a user device 112. The user device 112 corresponds to a user of one of the multiple client accounts supported by the database system 102. In some embodiments, the compute service manager 108 does not receive any direct communications from the user device 112 and only receives communications concerning jobs from a queue within the database system 102.

The compute service manager 108 is also coupled to database 114, which is associated with the data stored in the computing environment 100. The database 114 stores data pertaining to various functions and aspects associated with the database system 102 and its users. In some embodiments, the database 114 includes a summary of data stored in remote data storage systems as well as data available from a local cache. Additionally, the database 114 may include information regarding how data is organized in remote data storage systems (e.g., the storage platform 104) and the local caches. The database 114 allows systems and services to determine whether a piece of data needs to be accessed without loading or accessing the actual data from a storage device.

For example, the database 114 can include one or more pruning indexes. The compute service manager 108 may generate a pruning index for each source table accessed from the storage platform 104 and use a pruning index to prune the set of micro-partitions of a source table to scan for data in executing a query. That is, given a query directed at a source table organized into a set of micro-partitions, the compute service manager 108 can access a pruning index from the database 114 and use the pruning index to identify a reduced set of micro-partitions to scan in executing the query. The set of micro-partitions to scan in executing a query may be referred to herein as a "scan set."

In some embodiments, the compute service manager 108 may determine that a job should be performed based on data from the database 114. In such embodiments, the compute service manager 108 may scan the data and determine that a job should be performed to improve data organization or database performance. For example, the compute service manager 108 may determine that a new version of a source table has been generated and the pruning index has not been refreshed to reflect the new version of the source table. The database 114 may include a transactional change tracking stream indicating when the new version of the source table was generated and when the pruning index was last refreshed. Based on that transaction stream, the compute service manager 108 may determine that a job should be performed. In some embodiments, the compute service manager 108 determines that a job should be performed based on a trigger event and stores the job in a queue until the compute service manager 108 is ready to schedule and manage the execution of the job. In an embodiment of the disclosure, the compute service manager 108 determines whether a table or pruning index needs to be reclustered based on one or more data manipulation language (DML) commands being performed, wherein one or more of the DML commands constitute the trigger event.

The compute service manager 108 is further coupled to the execution platform 110, which provides multiple computing resources that execute various data storage and data retrieval tasks. The execution platform 110 is coupled to storage platform 104. The storage platform 104 comprises multiple data storage devices 106-1 to 106-N. In some embodiments, the data storage devices 106-1 to 106-N are cloud-based storage devices located in one or more geographic locations. For example, the data storage devices 106-1 to 106-N may be part of a public cloud infrastructure or a private cloud infrastructure. The data storage devices 106-1 to 106-N may be hard disk drives (HDDs), solid state drives (SSDs), storage clusters, Amazon S3™ storage systems or any other data storage technology. Additionally, the storage platform 104 may include distributed file systems (e.g., Hadoop Distributed File Systems (HDFS)), object storage systems, and the like.

The execution platform 110 comprises a plurality of compute nodes. A set of processes on a compute node executes a query plan compiled by the compute service manager 108. The set of processes can include: a first process to execute the query plan; a second process to monitor and delete micro-partition files using a least recently used (LRU) policy and implement an out of memory (OOM) error mitigation process; a third process that extracts health information from process logs and status to send back to the compute service manager 108; a fourth process to establish communication with the compute service manager 108 after a system boot; and a fifth process to handle all communication with a compute cluster for a given job provided by the compute service manager 108 and to communicate information back to the compute service manager 108 and other compute nodes of the execution platform 110.

In some embodiments, communication links between elements of the computing environment 100 are implemented via one or more data communication networks. These data communication networks may utilize any communication protocol and any type of communication medium. In some embodiments, the data communication networks are a combination of two or more data communication networks (or sub-networks) coupled to one another. In alternate embodiments, these communication links are implemented using any type of communication medium and any communication protocol.

As shown in FIG. 1, the data storage devices 106-1 to 106-N are decoupled from the computing resources associated with the execution platform 110. This architecture supports dynamic changes to the database system 102 based on the changing data storage/retrieval needs as well as the changing needs of the users and systems. The support of dynamic changes allows the database system 102 to scale quickly in response to changing demands on the systems and components within the database system 102. The decoupling of the computing resources from the data storage devices supports the storage of large amounts of data without requiring a corresponding large amount of computing resources. Similarly, this decoupling of resources supports a significant increase in the computing resources utilized at a particular time without requiring a corresponding increase in the available data storage resources.

The compute service manager 108, database 114, execution platform 110, and storage platform 104 are shown in FIG. 1 as individual discrete components. However, each of the compute service manager 108, database 114, execution platform 110, and storage platform 104 may be implemented as a distributed system (e.g., distributed across multiple systems/platforms at multiple geographic locations). Additionally, each of the compute service manager 108, database 114, execution platform 110, and storage platform 104 can be scaled up or down (independently of one another) depending on changes to the requests received and the changing needs of the database system 102. Thus, in the described embodiments, the database system 102 is dynamic and supports regular changes to meet the current data processing needs.

During typical operation, the database system 102 processes multiple jobs determined by the compute service manager 108. These jobs are scheduled and managed by the compute service manager 108 to determine when and how to execute the job. For example, the compute service manager 108 may divide the job into multiple discrete tasks and may determine what data is needed to execute each of the multiple discrete tasks. The compute service manager 108 may assign each of the multiple discrete tasks to one or more nodes of the execution platform 110 to process the task. The compute service manager 108 may determine what data is needed to process a task and further determine which nodes within the execution platform 110 are best suited to process the task. Some nodes may have already cached the data needed to process the task and, therefore, be a good candidate for processing the task. Metadata stored in the database 114 assists the compute service manager 108 in determining which nodes in the execution platform 110 have already cached at least a portion of the data needed to process the task. One or more nodes in the execution platform 110 process the task using data cached by the nodes and, if necessary, data retrieved from the storage platform 104. It is desirable to retrieve as much data as possible from caches within the execution platform 110 because the retrieval speed is typically much faster than retrieving data from the storage platform 104.

As shown in FIG. 1, the computing environment 100 separates the execution platform 110 from the storage platform 104. In this arrangement, the processing resources and cache resources in the execution platform 110 operate independently of the data storage devices 106-1 to 106-N in the storage platform 104. Thus, the computing resources and cache resources are not restricted to specific data storage devices 106-1 to 106-N. Instead, all computing resources and all cache resources may retrieve data from, and store data to, any of the data storage resources in the storage platform 104.

Figure 2:
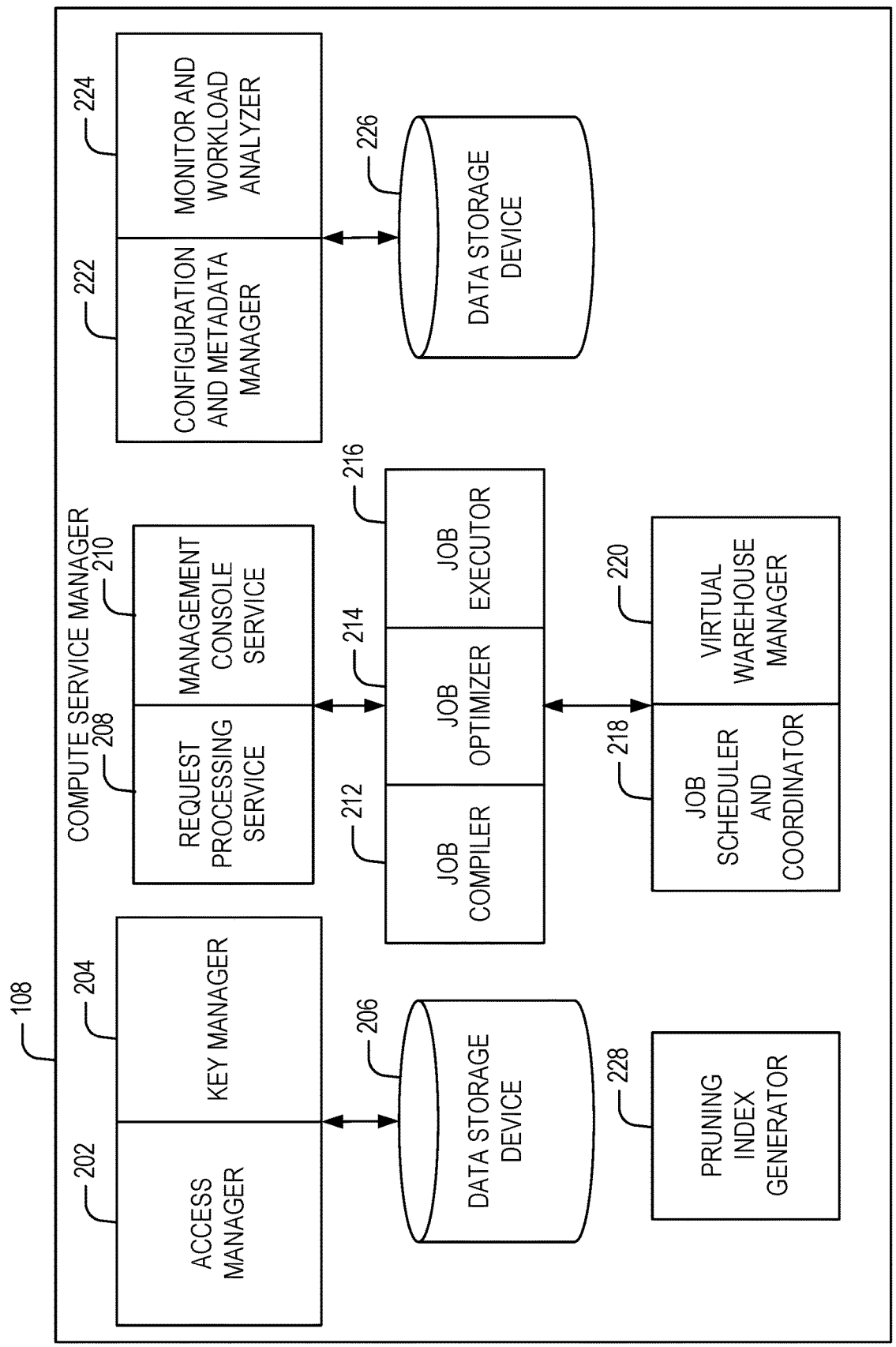
FIG. 2 is a block diagram illustrating components of a compute service manager, in accordance with some embodiments of the present disclosure.

FIG. 2 is a block diagram illustrating components of the compute service manager 108, in accordance with some embodiments of the present disclosure. As shown in FIG. 2, the compute service manager 108 includes an access manager 202 and a key manager 204 coupled to a data storage device 206. Access manager 202 handles authentication and authorization tasks for the systems described herein. Key manager 204 manages storage and authentication of keys used during authentication and authorization tasks. For example, access manager 202 and key manager 204 manage the keys used to access data stored in remote storage devices (e.g., data storage devices in storage platform 104). As used herein, the remote storage devices may also be referred to as "persistent storage devices" or "shared storage devices."

A request processing service 208 manages received data storage requests and data retrieval requests (e.g., jobs to be performed on database data). For example, the request processing service 208 may determine the data necessary to process a received query (e.g., a data storage request or data retrieval request). The data may be stored in a cache within the execution platform 110 or in a data storage device in storage platform 104.

A management console service 210 supports access to various systems and processes by administrators and other system managers. Additionally, the management console service 210 may receive a request to execute a job and monitor the workload on the system.

The compute service manager 108 also includes a job compiler 212, a job optimizer 214, and a job executor 216. The job compiler 212 parses a job into multiple discrete tasks and generates the execution code for each of the multiple discrete tasks. The job optimizer 214 determines the best method to execute the multiple discrete tasks based on the data that needs to be processed. The job optimizer 214 also handles various data pruning operations and other data optimization techniques to improve the speed and efficiency of executing the job. The job executor 216 executes the execution code for jobs received from a queue or determined by the compute service manager 108.

A job scheduler and coordinator 218 sends received jobs to the appropriate services or systems for compilation, optimization, and dispatch to the execution platform 110. For example, jobs may be prioritized and then processed in that prioritized order. In an embodiment, the job scheduler and coordinator 218 determines a priority for internal jobs that are scheduled by the compute service manager 108 with other "outside" jobs such as user queries that may be scheduled by other systems in the database but may utilize the same processing resources in the execution platform 110. In some embodiments, the job scheduler and coordinator 218 identifies or assigns particular nodes in the execution platform 110 to process particular tasks. A virtual warehouse manager 220 manages the operation of multiple virtual warehouses implemented in the execution platform 110. As discussed below, each virtual warehouse includes multiple execution nodes that each include a cache and a processor.

Additionally, the compute service manager 108 includes a configuration and metadata manager 222, which manages the information related to the data stored in the remote data storage devices and in the local caches (e.g., the caches in execution platform 110). The configuration and metadata manager 222 uses the metadata to determine which data micro-partitions need to be accessed to retrieve data for processing a particular task or job. A monitor and workload analyzer 224 oversees processes performed by the compute service manager 108 and manages the distribution of tasks (e.g., workload) across the virtual warehouses and execution nodes in the execution platform 110. The monitor and workload analyzer 224 also redistributes tasks, as needed, based on changing workloads throughout the database system 102 and may further redistribute tasks based on a user (e.g., "external") query workload that may also be processed by the execution platform 110. The configuration and metadata manager 222 and the monitor and workload analyzer 224 are coupled to a data storage device 226. Data storage device 226 in FIG. 2 represents any data storage device within the database system 102. For example, data storage device 226 may represent caches in execution platform 110, storage devices in storage platform 104, or any other storage device.

As shown, the compute service manager 108 further includes a pruning index generator 228. The pruning index generator 228 is responsible for generating pruning indexes to be used in pruning scan sets for queries directed to tables stored in the storage platform 104. Each pruning index comprises a set of filters (e.g., blocked bloom filters, bloom filters, hash filter, or cuckoo filters) that encode an existence of unique values in each column of a source table. The pruning index generator 228 generates a filter for each micro-partition of a source table and each filter indicates whether data matching a query is potentially stored on a particular micro-partition of the source table. Further details regarding the generation of pruning indexes are discussed below.

Figure 3:
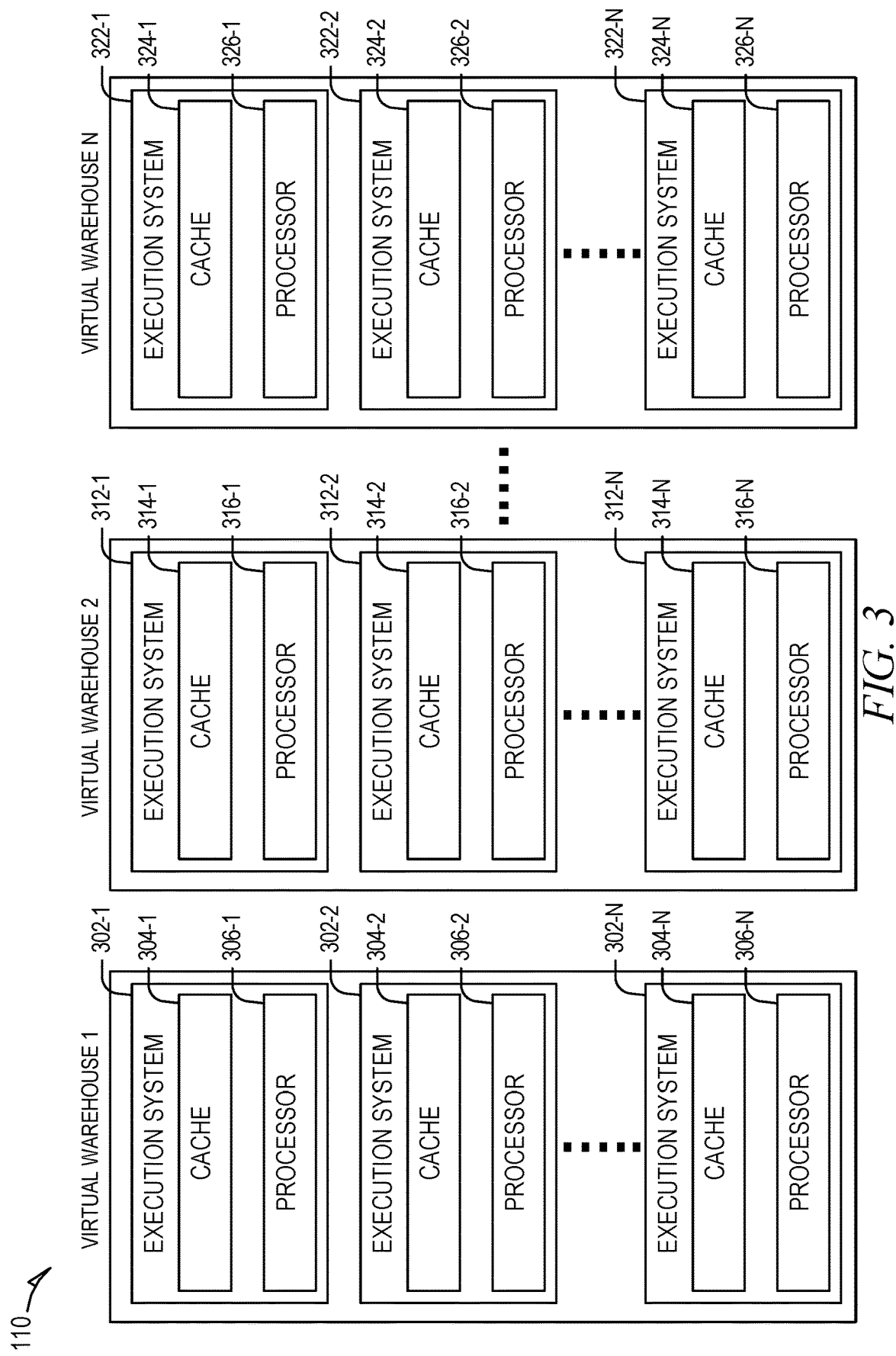
FIG. 3 is a block diagram illustrating components of an execution platform, in accordance with some embodiments of the present disclosure.

FIG. 3 is a block diagram illustrating components of the execution platform 110, in accordance with some embodiments of the present disclosure. As shown in FIG. 3, the execution platform 110 includes multiple virtual warehouses, including virtual warehouse 1, virtual warehouse 2, and virtual warehouse n. Each virtual warehouse includes multiple execution nodes that each includes a data cache and a processor. The virtual warehouses can execute multiple tasks in parallel by using the multiple execution nodes. As discussed herein, the execution platform 110 can add new virtual warehouses and drop existing virtual warehouses in real-time based on the current processing needs of the systems and users. This flexibility allows the execution platform 110 to quickly deploy large amounts of computing resources when needed without being forced to continue paying for those computing resources when they are no longer needed. All virtual warehouses can access data from any data storage device (e.g., any storage device in storage platform 104).

Although each virtual warehouse shown in FIG. 3 includes three execution nodes, a particular virtual warehouse may include any number of execution nodes. Further, the number of execution nodes in a virtual warehouse is dynamic, such that new execution nodes are created when additional demand is present, and existing execution nodes are deleted when they are no longer necessary.

Each virtual warehouse is capable of accessing any of the data storage devices 106-1 to 106-N shown in FIG. 1. Thus, the virtual warehouses are not necessarily assigned to a specific data storage device 106-1 to 106-N and, instead, can access data from any of the data storage devices 106-1 to 106-N within the storage platform 104. Similarly, each of the execution nodes shown in FIG. 3 can access data from any of the data storage devices 106-1 to 106-N. In some embodiments, a particular virtual warehouse or a particular execution node may be temporarily assigned to a specific data storage device, but the virtual warehouse or execution node may later access data from any other data storage device.

In the example of FIG. 3, virtual warehouse 1 includes three execution nodes 302-1, 302-2, and 302-N. Execution node 302-1 includes a cache 304-1 and a processor 306-1. Execution node 302-2 includes a cache 304-2 and a processor 306-2. Execution node 302-N includes a cache 304-N and a processor 306-N. Each execution node 302-1, 302-2, and 302-N is associated with processing one or more data storage and/or data retrieval tasks. For example, a virtual warehouse may handle data storage and data retrieval tasks associated with an internal service, such as a clustering service, a materialized view refresh service, a file compaction service, a storage procedure service, or a file upgrade service. In other implementations, a particular virtual warehouse may handle data storage and data retrieval tasks associated with a particular data storage system or a particular category of data.

Similar to virtual warehouse 1 discussed above, virtual warehouse 2 includes three execution nodes 312-1, 312-2, and 312-N. Execution node 312-1 includes a cache 314-1 and a processor 316-1. Execution node 312-2 includes a cache 314-2 and a processor 316-2. Execution node 312-N includes a cache 314-N and a processor 316-N. Additionally, virtual warehouse N includes three execution nodes 322-1, 322-2, and 322-N. Execution node 322-1 includes a cache 324-1 and a processor 326-1. Execution node 322-2 includes a cache 324-2 and a processor 326-2. Execution node 322-N includes a cache 324-N and a processor 326-N.

In some embodiments, the execution nodes shown in FIG. 3 are stateless with respect to the data the execution nodes are caching. For example, these execution nodes do not store or otherwise maintain state information about the execution node or the data being cached by a particular execution node. Thus, in the event of an execution node failure, the failed node can be transparently replaced by another node. Since there is no state information associated with the failed execution node, the new (replacement) execution node can easily replace the failed node without concern for recreating a particular state.

Although the execution nodes shown in FIG. 3 each includes one data cache and one processor, alternate embodiments may include execution nodes containing any number of processors and any number of caches. Additionally, the caches may vary in size among the different execution nodes. The caches shown in FIG. 3 store, in the local execution node, data that was retrieved from one or more data storage devices in storage platform 104. Thus, the caches reduce or eliminate the bottleneck problems occurring in platforms that consistently retrieve data from remote storage systems. Instead of repeatedly accessing data from the remote storage devices, the systems and methods described herein access data from the caches in the execution nodes, which is significantly faster and avoids the bottleneck problem discussed above. In some embodiments, the caches are implemented using high-speed memory devices that provide fast access to the cached data. Each cache can store data from any of the storage devices in the storage platform 104.

Further, the cache resources and computing resources may vary between different execution nodes. For example, one execution node may contain significant computing resources and minimal cache resources, making the execution node useful for tasks that require significant computing resources. Another execution node may contain significant cache resources and minimal computing resources, making this execution node useful for tasks that require caching of large amounts of data. Yet another execution node may contain cache resources providing faster input-output operations, useful for tasks that require fast scanning of large amounts of data. In some embodiments, the cache resources and computing resources associated with a particular execution node are determined when the execution node is created, based on the expected tasks to be performed by the execution node.

Additionally, the cache resources and computing resources associated with a particular execution node may change over time based on changing tasks performed by the execution node. For example, an execution node may be assigned more processing resources if the tasks performed by the execution node become more processor-intensive. Similarly, an execution node may be assigned more cache resources if the tasks performed by the execution node require a larger cache capacity.

Although virtual warehouses 1, 2, and n are associated with the same execution platform 110, the virtual warehouses may be implemented using multiple computing systems at multiple geographic locations. For example, virtual warehouse 1 can be implemented by a computing system at a first geographic location, while virtual warehouses 2 and n are implemented by another computing system at a second geographic location. In some embodiments, these different computing systems are cloud-based computing systems maintained by one or more different entities.

Additionally, each virtual warehouse is shown in FIG. 3 as having multiple execution nodes. The multiple execution nodes associated with each virtual warehouse may be implemented using multiple computing systems at multiple geographic locations. For example, an instance of virtual warehouse 1 implements execution nodes 302-1 and 302-2 on one computing platform at a geographic location and implements execution node 302-N at a different computing platform at another geographic location. Selecting particular computing systems to implement an execution node may depend on various factors, such as the level of resources needed for a particular execution node (e.g., processing resource requirements and cache requirements), the resources available at particular computing systems, communication capabilities of networks within a geographic location or between geographic locations, and which computing systems are already implementing other execution nodes in the virtual warehouse.

Execution platform 110 is also fault tolerant. For example, if one virtual warehouse fails, that virtual warehouse is quickly replaced with a different virtual warehouse at a different geographic location.

A particular execution platform 110 may include any number of virtual warehouses. Additionally, the number of virtual warehouses in a particular execution platform is dynamic, such that new virtual warehouses are created when additional processing and/or caching resources are needed. Similarly, existing virtual warehouses may be deleted when the resources associated with the virtual warehouse are no longer necessary.

In some embodiments, the virtual warehouses may operate on the same data in storage platform 104, but each virtual warehouse has its own execution nodes with independent processing and caching resources. This configuration allows requests on different virtual warehouses to be processed independently and with no interference between the requests. This independent processing, combined with the ability to dynamically add and remove virtual warehouses, supports the addition of new processing capacity for new users without impacting the performance observed by the existing users.

Figure 4:
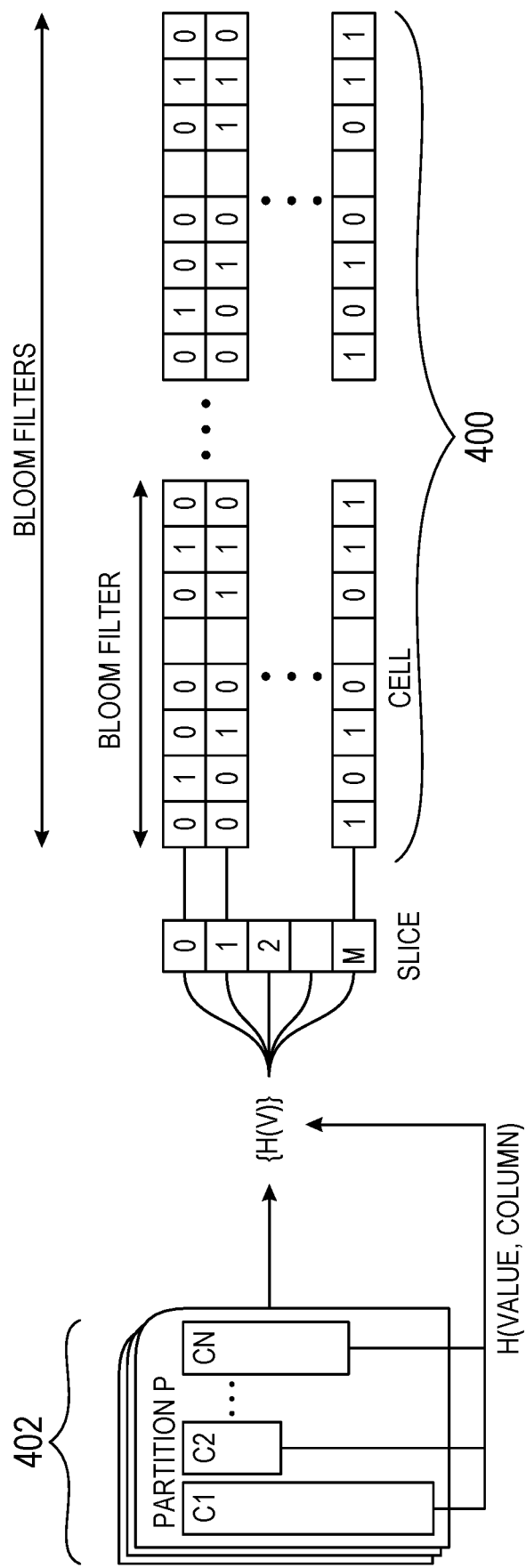
FIG. 4 is a conceptual diagram illustrating generation of an example blocked bloom filter, which may form part of a pruning index, in accordance with some example embodiments.

FIG. 4 is a conceptual diagram illustrating generation of a filter 400, which forms part of a pruning index generated by the database system 102 based on a source table 402, in accordance with some example embodiments. As shown, the source table 402 is organized into multiple micro-partitions and each micro-partition comprises multiple columns in which values are stored.

In generating a pruning index, the compute service manager 108 generates a filter for each micro-partition of the source table 402, an example of which is illustrated in FIG. 4 as blocked bloom filter 400. Blocked bloom filter 400 comprises multiple bloom filters and encodes the existence of distinct values present in each column of the corresponding micro-partition. When a query is received, rather than scanning the entire source table 402 to evaluate the query, the database system 102 probes the pruning index to identify a reduced scan set of micro-partitions comprising only a subset of the micro-partitions of the source table 402.

As shown, the blocked bloom filter 400 is decomposed into N bloom filters stored as individual columns of the pruning index to leverage columnar scans. In generating the blocked bloom filter 400 for a particular micro-partition of the source table 402, values of stored values or preprocessed variants thereof are transformed into bit positions in the bloom filters. For example, a set of fingerprints (e.g., hash values) can be generated from stored values (or N-grams generated from stored values) in each column of the micro-partition and the set of fingerprints may be used to set bits in the bloom filters. Each line of the blocked bloom filter 400 is encoded and stored as a single row in the pruning index. Each bloom filter 400 is represented in the pruning index as a two-dimensional array indexed by the fingerprints for the stored column values.

FIG. 5 illustrates a portion of an example pruning index 500, in accordance with some embodiments of the present disclosure. The example pruning index 500 is organized into a plurality of rows and columns. The columns of the pruning index 500 comprise a partition number 502 to store a partition identifier and a blocked bloom filter 504 (e.g., the blocked bloom filter 400) that is decomposed into multiple numeric columns; each column in the blocked bloom filter 504 represents a bloom filter. To avoid obscuring the inventive subject matter with unnecessary detail, various additional columns that are not germane to conveying an understanding of the inventive subject matter may have been omitted from the example pruning index 500 in FIG. 5.

Figure 6:
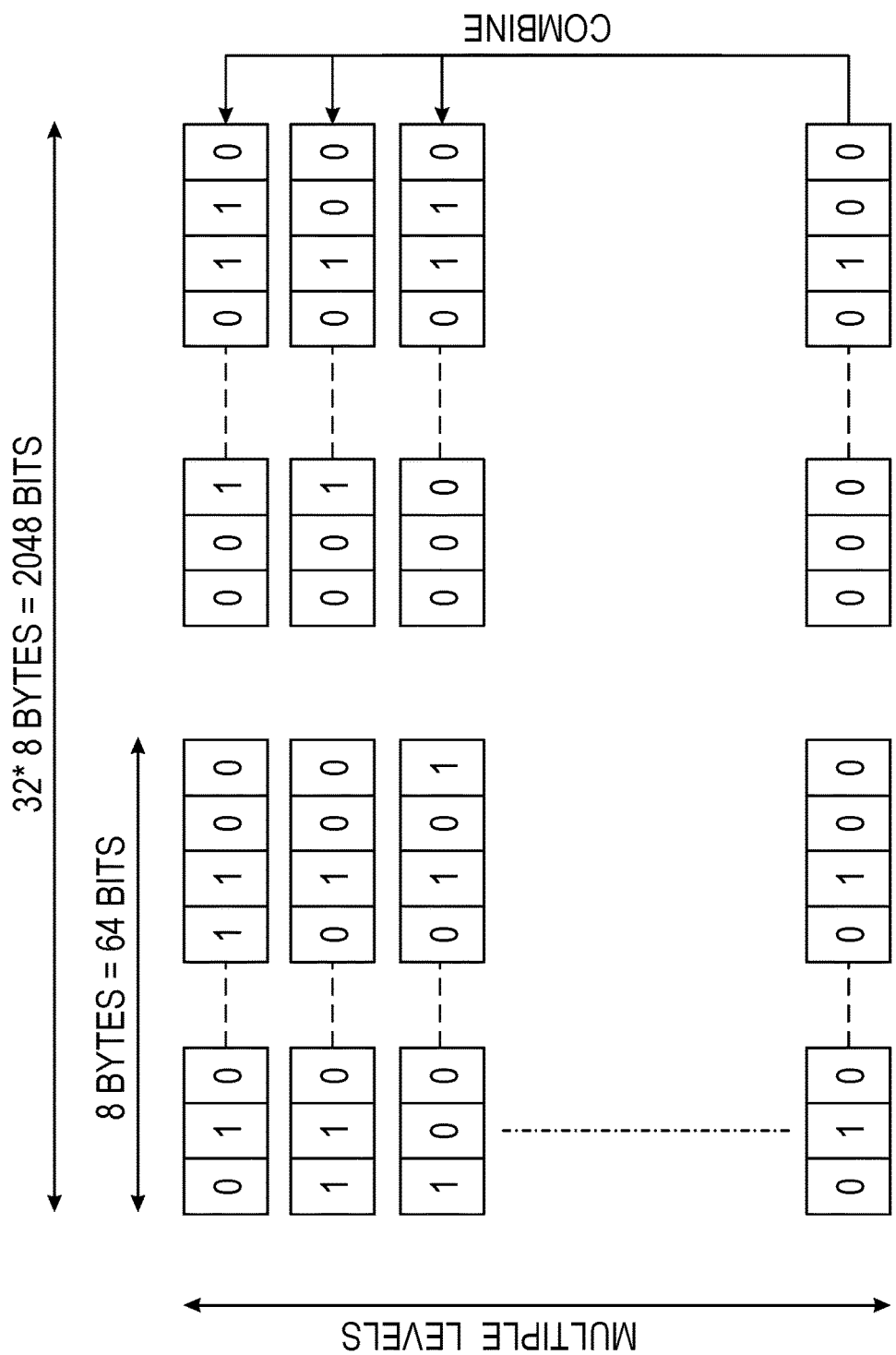
FIG. 6 is a conceptual diagram illustrating further details regarding the creation of an example pruning index, in accordance with some embodiments.

FIG. 6 is a conceptual diagram illustrating creation of an example pruning index, in accordance with some embodiments. The creation of a filter (e.g., a blocked bloom filter) is performed by a specialized operator within the compute service manager 108 that computes the set of rows of the pruning index. This operator obtains all the columns of a particular micro-partition of a source table and populates the filter for that micro-partition.

If the total number of distinct values (or distinct N-grams of stored values) in the source table is unknown, the compute service manager 108 allocates a maximum number of levels to the pruning index, populates each filter, and then applies a consolidation phase to merge the different filters in a final representation of the pruning index. The memory allocated to compute this information per micro-partition is constant. In the example illustrated in FIG. 6, the memory allocated to compute this information is a two-dimensional array of unsigned integers. The first dimension is indexed by the level (maximum number of levels) and the second dimension is indexed by the number of bloom filters. Since each partition is processed by a single thread, the total memory is bounded by the number of threads (e.g., 8) and the maximum level of levels.

As shown in FIG. 6, at each partition boundary, the compute service manager 108 combines blocks based on a target bloom filter density. For example, the compute service manager 108 may combine blocks such that the bloom filter density is no more than half Since the domain of fingerprints (e.g., hashed values) is uniform, this can be done incrementally or globally based on the observed number of distinct values computed above.

If the number of distinct values is known, the compute service manager 108 determines the number of levels for the pruning index by dividing the maximum number of distinct values (or distinct N-grams) by the number of distinct values (or distinct N-grams) per level. To combine two levels, the compute service manager 108 performs a logical OR on all the integers representing the filter.

For performance reasons, the filter functions (create and check) can combine two hash functions (e.g., two 32-bit hash functions). Both the hash function computation and the filter derivation need to be identical on both the execution platform 110 and compute service manager 108 to allow for pruning in compute service manager 108 and in the scan set initialization in the execution platform 110.

Figure 7:
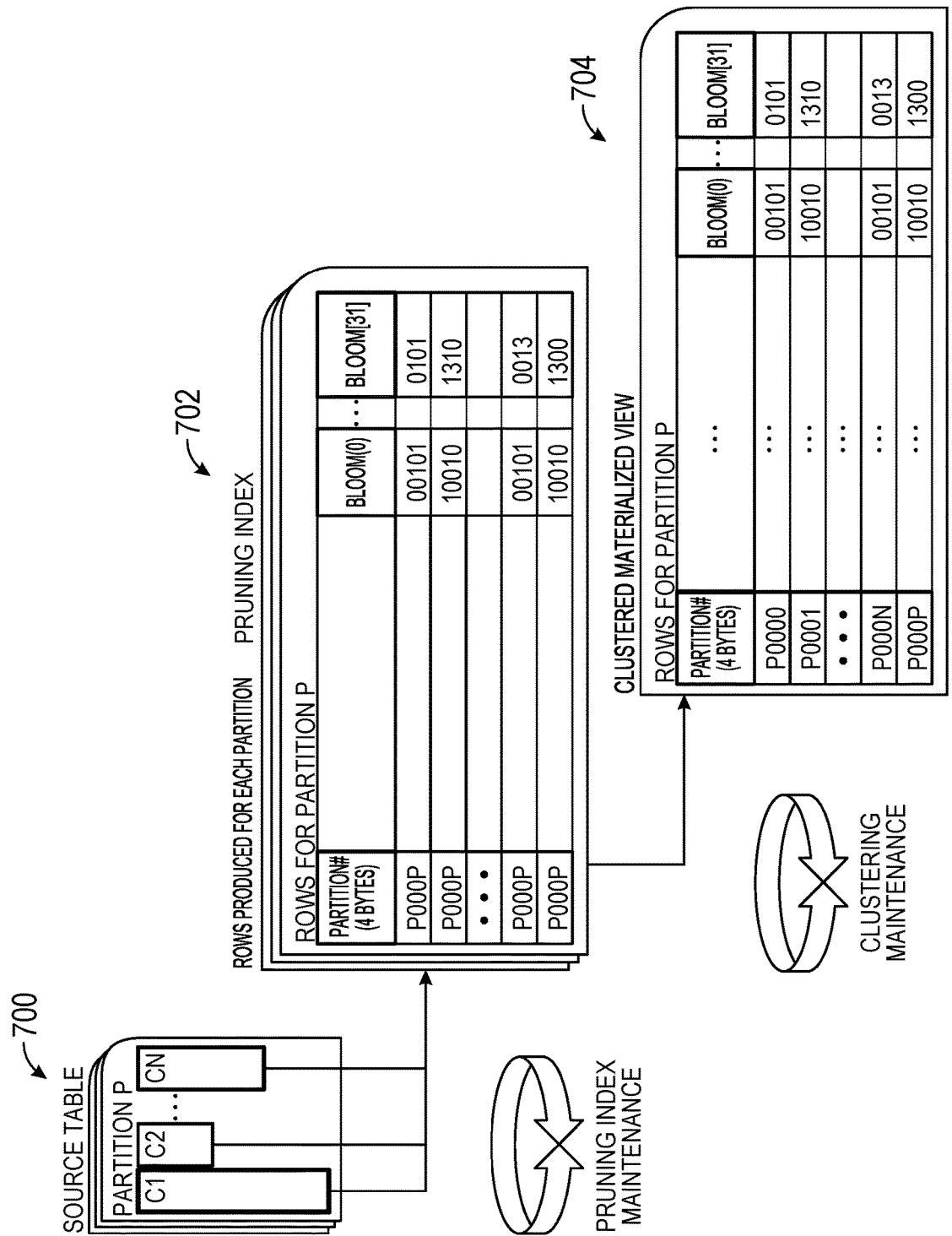
FIG. 7 is a conceptual diagram illustrating maintenance of a pruning index, in accordance with some embodiments.
Figure 8:
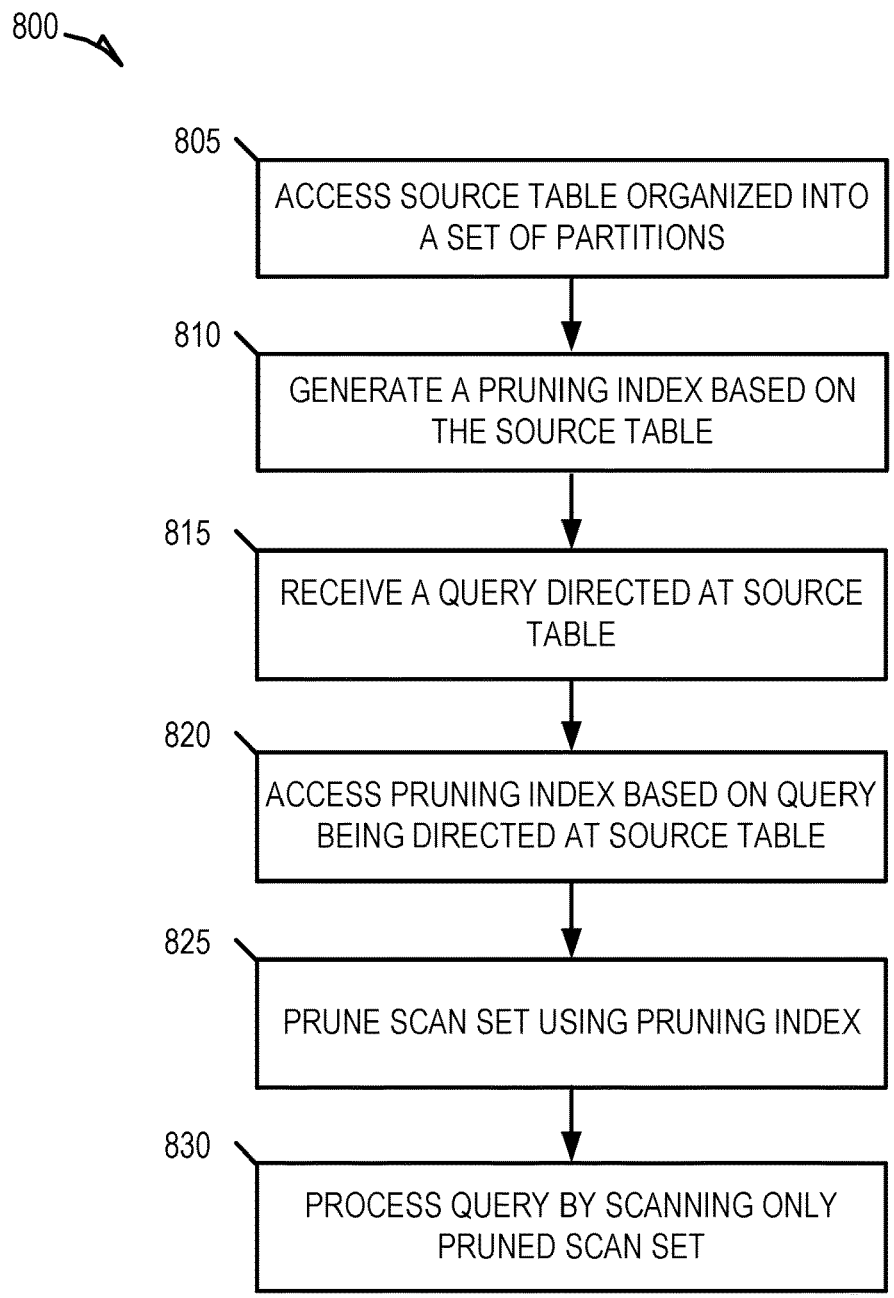
FIGS. 8-13 are flow diagrams illustrating operations of the network-based database system in performing a method for generating and using a pruning index in processing a database query, in accordance with some embodiments of the present disclosure.

FIG. 7 is a conceptual diagram illustrating maintenance of a pruning index based on changes to a source table, in accordance with some embodiments. As shown, at 700, a change is made to a source table (e.g., addition of one or more rows or columns). The change to the source table triggers generation of additional rows in the pruning index for each changed or new micro-partition of the source table, at 702. At a regular interval, the newly produced rows in the pruning index are reclustered, at 704.

The compute service manager 108 uses a deterministic selection algorithm as part of clustering the pruning index. The processing of each micro-partition in the source table creates a bounded (and mostly constant) number of rows based on the number of distinct values (or N-grams of stored values) in the source micro-partition. By construction, those rows are known to be unique and the index domain is non-overlapping for that partition and fully overlapping with already clustered index rows. To minimize the cost of clustering, the compute service manager 108 delays reclustering of rows until a threshold number of rows have been produced to create constant partitions.

Although the pruning index is described in some embodiments as being implemented specifically with blocked bloom filters, it shall be appreciated that the pruning index is not limited to blocked bloom filters, and in other embodiments, the pruning index may be implemented using other filters such as bloom filters, hash filters, or cuckoo filters.

FIGS. 8-13 are flow diagrams illustrating operations of the database system 102 in performing a method 800 for generating and using a pruning index in processing a database query, in accordance with some embodiments of the present disclosure. The method 800 may be embodied in computer-readable instructions for execution by one or more hardware components (e.g., one or more processors) such that the operations of the method 800 may be performed by components of database system 102. Accordingly, the method 800 is described below, by way of example with reference thereto. However, it shall be appreciated that method 800 may be deployed on various other hardware configurations and is not intended to be limited to deployment within the database system 102.

Depending on the embodiment, an operation of the method 800 may be repeated in different ways or involve intervening operations not shown. Though the operations of the method 800 may be depicted and described in a certain order, the order in which the operations are performed may vary among embodiments, including performing certain operations in parallel or performing sets of operations in separate processes. For example, although the use and generation of the pruning index are described and illustrated together as part of the method 800, it shall be appreciated that the use and generation of the pruning index may be performed as separate processes, consistent with some embodiments.

At operation 805, the compute service manager 108 accesses a source table that is organized into a plurality of micro-partitions. The source table comprises a plurality of cells organized into rows and columns and a data value is included in each cell.

At operation 810, the compute service manager 108 generates a pruning index based on the source table. The pruning index comprises a set of filters (e.g., a set of blocked bloom filters) that index distinct values (or distinct N-grams of stored values) in each column of each micro-partition of the source table. A filter is generated for each micro-partition in the source table and each filter is decomposed into multiple numeric columns (e.g., 32 numeric columns) to enable integer comparisons. Consistent with some embodiments, the pruning index comprises a plurality of rows and each row comprises at least a micro-partition identifier and a set of bloom filters. Consistent with some embodiments, the compute service manager 108 generates the pruning index in an offline process before receiving a query.

At operation 815, the compute service manager 108 receives a query directed at the source table. The query can comprise an equality predicate (e.g., "=") or a pattern matching predicate (e.g., LIKE, ILIKE, CONTAINS, STARTSWITH, ENDSWITH, REGEXP, RLIKE, etc.). In instances in which the query includes a pattern matching predicate, the query specifies a search pattern for which matching stored data in the source table is to be identified. A query predicate can be directed to primitive data types (e.g., STRING, NUMBER, or the like), complex data types (e.g., ARRAY or OBJECT), semi-structured data types (e.g., JSON, XML, Parquet, and ORC), or combinations thereof.

At operation 820, the compute service manager 108 accesses the pruning index associated with the source table based on the query being directed at the source table. For example, the database 114 may store information describing associations between tables and pruning indexes.

At operation 825, the compute service manager 108 uses the pruning index to prune the set of micro-partitions of the source table to be scanned for data that satisfies the query (e.g., a data value that satisfies the equality predicate or data that matches the search pattern). That is, the compute service manager 108 uses the pruning index to identify a reduced scan set comprising only a subset of the micro-partitions of the source table. The reduced scan set includes one or more micro-partitions in which data that satisfies the query is potentially stored. The subset of micro-partitions of the source table include micro-partitions determined to potentially include data that satisfies the query based on the set of bloom filters in the pruning index.

At operation 830, the execution platform 110 processes the query. In processing the query, the execution platform 110 scans the subset of micro-partitions of the reduced scan set while foregoing a scan of the remaining micro-partitions. In this way, the execution platform 110 searches only micro-partitions where matching data is potentially stored while foregoing an expenditure of additional time and resources to also search the remaining micro-partitions for which it is known, based on the pruning index, that matching data is not stored.

Consistent with some embodiments, rather than providing a reduced scan set with micro-partitions of the source table to scan for data, the compute service manager 108 may instead identify and compile a set of non-matching micro-partitions. The compute service manager 108 or the execution platform 110 may remove micro-partitions from the scan set based on the set of non-matching micro-partitions.

Figure 9:
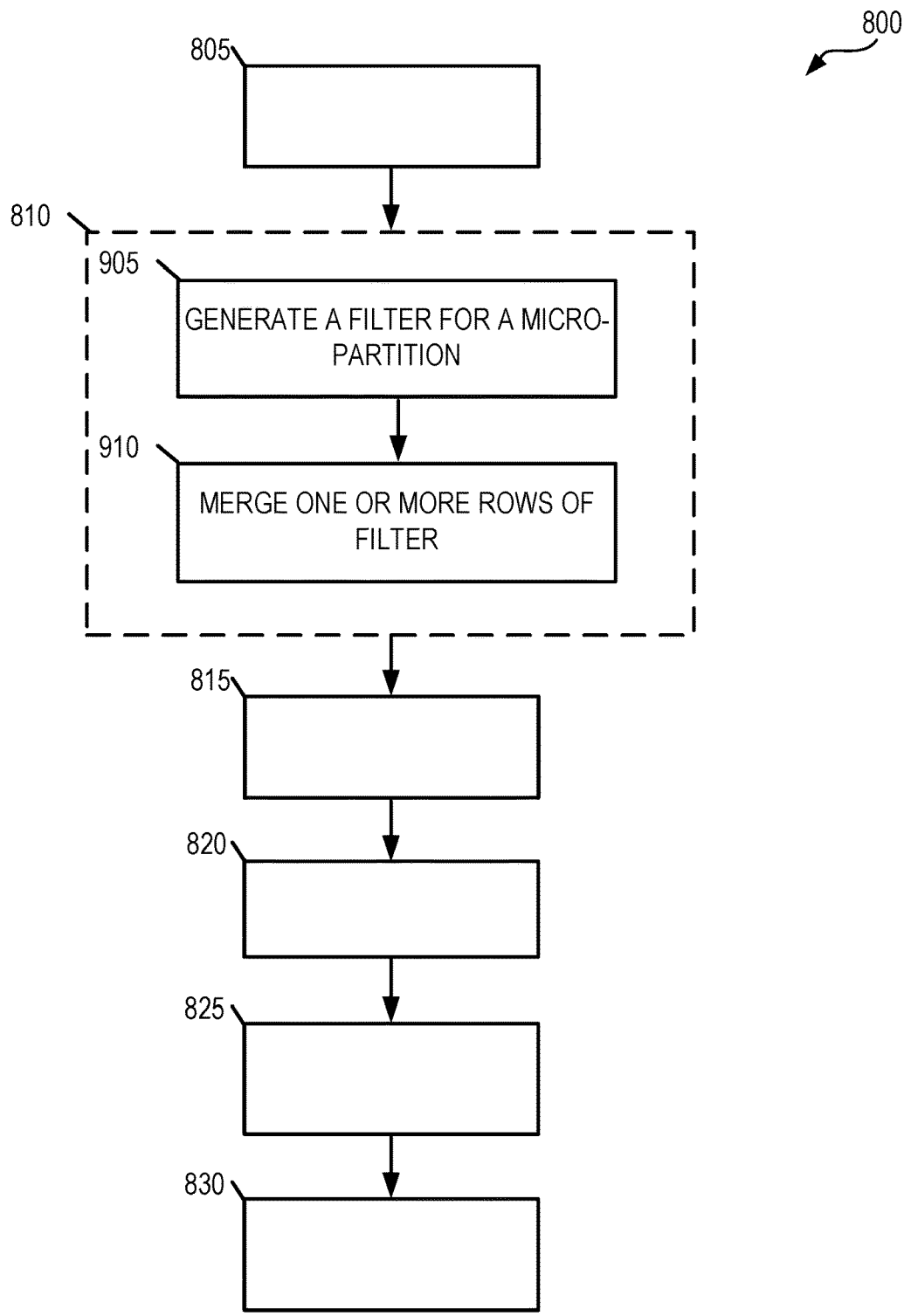

As shown in FIG. 9, the method 800 may, in some embodiments, further include operations 905 and 910. Consistent with these embodiments, the operations 905 and 910 may be performed as part of the operation 810 where the compute service manager 108 generates the pruning index. The operations 905 and 910 are described below in reference to a single micro-partition of the source table simply for ease of explanation. However, it shall be appreciated that in generating the pruning index, the compute service manager 108 generates a filter for each micro-partition of the source table, and thus the operations 905 and 910 may be performed for each micro-partition of the source table.

At operation 905, the compute service manager 108 generates a filter for a micro-partition of the source table. For example, the compute service manager 108 may generate a blocked bloom filter for the micro-partition that indexes distinct values (or distinct N-grams of values) in each column of the micro-partition of the source table. The generating of the filter can include generating a set of fingerprints for each searchable data value in the micro-partition.

Given that values in semi-structured data type columns can be stored as potentially multiple different data types by the network-based database system 102 (referred to herein as "stored data types"), the compute service manager 108 can, in some embodiments, generate fingerprints for a given value in a semi-structured column of the source table based on one or more data type transformations generated for the value, as will be discussed in further detail below. A data type transformation can be generated by converting a data value into a stored data type, for example, using an SQL Cast Function (also referred to simply as a "cast"). By generating fingerprints in this matter, the compute service manager 108 can support indexing of semi-structured data type values included in the source table.

In some embodiments, for a given data value in the micro-partition, the compute service manager 108 can generate the set of fingerprints based on a set of N-grams generated for the data value. The set of N-grams can be generated based on the data value or one or more preprocessed variants of the data value. The compute service manager 108 can generate a fingerprint based on a hash that is computed of an N-gram.

In computing the hash, the compute service manager 108 may utilize a rolling hash function or other known hashing scheme that allows individual characters to be added or removed from a window of characters. An example hash function used by the compute service manager 108 is the XxHash( ) function, although other known hash functions can be utilized. Each generated fingerprint is used to populate a cell in the filter.

At operation 910, which is optional in some embodiments, the compute service manager 108 merges one or more rows of the filter. The compute service manager 108 can merge rows by performing a logical OR operation. The compute service manager 108 may merge rows of the filter until a density threshold is reached, where the density refers to the ratio of 1s and 0s in a row. The density threshold may be based on a target false positive rate.

The source table can include one or more columns of data of a semi-structured data type used to store values of any kind such as primitive data types like numbers, strings, binary data, date, time, and timestamp values, as well as compound data types such as values and arrays that store a nested structure inside. Accordingly, it is important that pruning indexes generated by the database system 102 also support query predicates on semi-structured data types in addition to predicates on primitive data-type fields. As non-limiting examples, a pruning index can be generated to support the following types of predicates:

. . . where <path_to_semi-structured_data_type_field>=<constant>;
. . . where <path_to_semi-structured_data_type_field>::<cast_to_type>=<constant>
. . . where <semi-structured_data_type_column>=<constant>;
. . . where <path_to_semi-structured_data_type_field> like '% pattern %';
. . . where <semi-structured_data_type_column> like '% pattern %';
. . . where array_contains(<value>, <array>);
. . . where arrays_overlap(<array1>, <array2>)
. . . where is_<any_data_type>(<path_to_semi-structured_data_type_field>)
. . . where <semi-structured_data_type_column> is null
. . . where <semi-structured_data_type_field> is not null Extending the pruning index to support such semi-structured predicate types can present a number of challenges. For example, semi-structured data type schemas such as JSON schemas can be highly nested (e.g., a field can contain an ARRAY object, which in turn holds values of heterogeneous types, including other complex types such as OBJECT or ARRAY). As another example, semi-structured data can evolve in time (e.g., new fields can be added or existing fields can be removed). As another example, the data type for the same field in one row can be different from the one in another row (e.g., an ID field can be represented as a NUMBER and STRING in different rows). As yet another example of the challenges posed by semi-structured data types, a single value might correspond to multiple data types (e.g., a STRING value can contain a valid DATE, TIME, TIMESTAMP, NUMBER, etc. data types). In still another example, the same value might match against several semi-structured data types due to the presence of a cast function (e.g., a TIMESTAMP value can be stored inside semi-structured data object of any TIMESTAMP version, as a NUMBER, as a STRING of TIMESTAMP, as a STRING of INTEGER).

Figure 10:
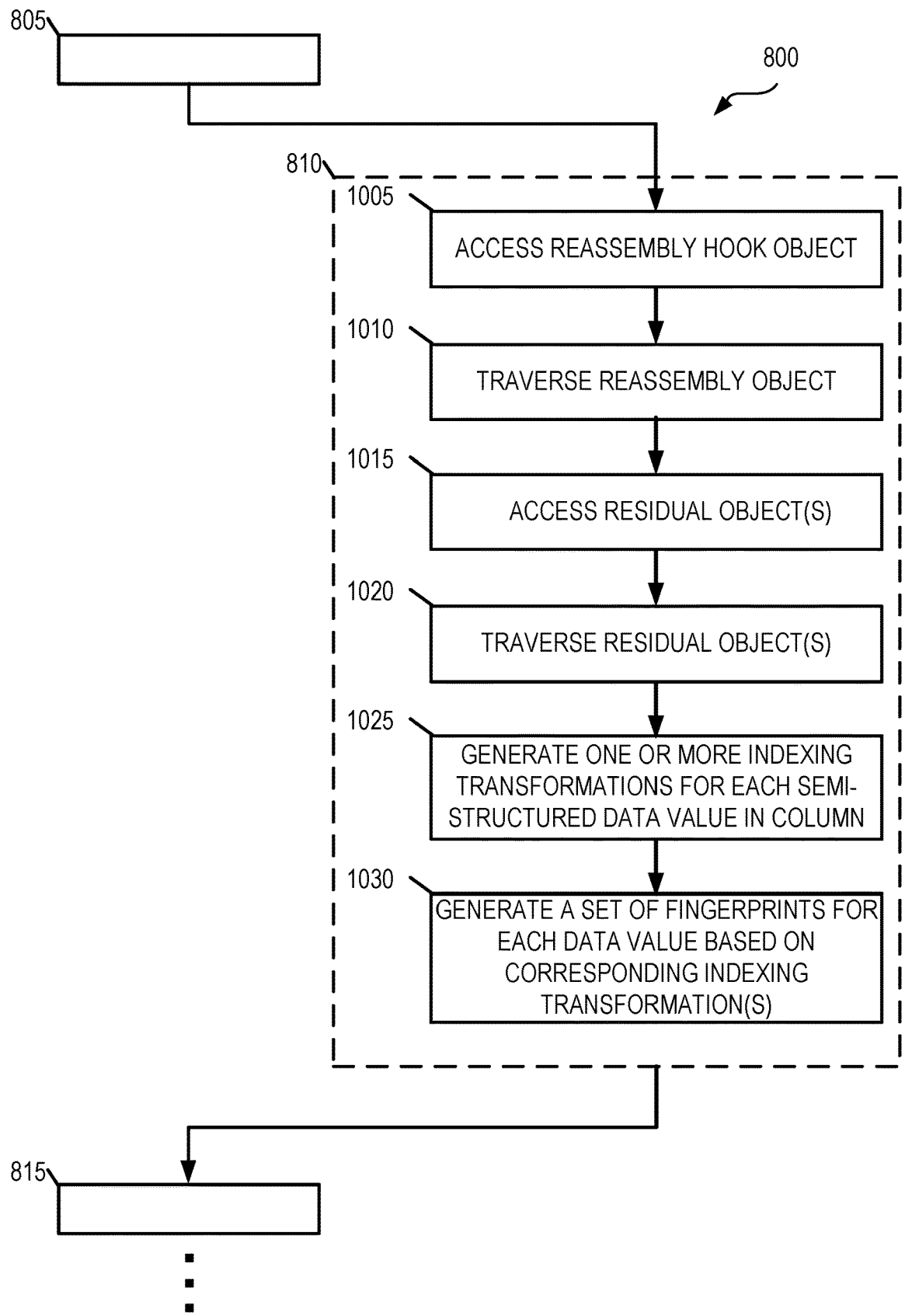

To extend the pruning index to support predicates on semi-structured data fields while addressing the foregoing challenges, operations 1005, 1010, 1015, 1020, 1025, and 1030 can be performed as part of the method 800, as shown in FIG. 10. Consistent with these embodiments, the operations 1005, 1010, 1015, 1020, 1025, and 1030 may be performed as part of operation 810 where the compute service manager 108 generates the pruning index for the source table.

At operation 1005, the compute service manager 108 accesses a reassembly hook object that includes information about semi-structured data in a column of the source table (also referred to as a "semi-structured data type column"). More specifically, the reassembly hook object includes information about a first portion of the semi-structured data that is subcolumnarized within the column of the source table. That is, the first portion of the semi-structured data is stored in columnar form within the column of the source table. The reassembly hook object comprises a first data structure that represents the first portion of the semi-structured data (the subcolumnarized portion). For example, the first data structure may include a tree structure comprising a root node and one or more branches, each of which include at least one child node that branches off the root node. Each branch corresponds to a subcolumnarized path extracted from the semi-structured data and a leaf node in each branch comprises a pointer to a set of primitive values (also referred to as a "primitive node") for the subcolumnarized path. In an example, the first portion of the semi-structured data includes a subcolumnarized path and the first tree structure includes a branch with a leaf node that includes a pointer to primitive values corresponding to the subcolumnarized path.

At operation 1010, the compute service manager 108 traverses the reassembly hook object to identify a first set of values corresponding to the first portion of the semi-structured data (the subcolumnarized portion of the semi-structured data). For example, the compute service manager 108 may traverse the first data structure to identify the primitive values for each subcolumnarized path in the first portion of semi-structured data.

At operation 1015, the compute service manager 108 accesses one or more residual objects comprising information about a second portion of the semi-structured data that is not subcolumnarized. Each residual object comprises information about at least a portion of the second portion of the semi-structured data. More specifically, each residual object comprises a second data structure representing at least a portion of the second portion of the semi-structured data. The second data structure may include a tree data structure or linear data structure with one or more nodes, each of which corresponds to an element from the second portion of the semi-structured data. The second data structure includes a node with a value from the second portion of the semi-structured data.

At operation 1020, the compute service manager 108 traverses the one or more residual objects to identify a second set of values corresponding to the second portion of the semi-structured data (the non-subcolumnarized portion of the semi-structured data).

At operation 1025, the compute service manager 108 generates one or more indexing transformations for values from the semi-structured data type column of the source table (the first set of values corresponding to the first portion of the semi-structured data and the second set of values corresponding to the second portion of semi-structured data). The compute service manager 108 can generate an indexing transformation for a given value using a SQL cast function. Invocation of a cast function on a value is also referred to herein as "casting." The compute service manager 108 uses the cast function to convert the value to a stored data type. That is, the compute service manager 108 can cast the value from an input data type to a stored data type to generate an indexing transformation. In some instances, the compute service manager 108 generates an indexing transformation by casting the value from a first logical data type (e.g., FIXED) to a second logical data type (e.g., REAL). In some instances, the compute service manager 108 generates an indexing transformation by casting the value to the same logical data type with a different scale and/or precision (e.g., a FIXED->FIXED (PRECISION, SCALE) transformation).

In instances of ARRAY and OBJECT data types, the compute service manager 108 generates an indexing transformation based on a path (e.g., an SQL path) of the data. More specifically, the compute service manager 108 generates a token for the indexing transformation that indicates that a complex path (corresponding to an ARRAY or OBJECT data type) is not indexed specifically. In an example of the forgoing, input data includes:

{"id": 45, "name": "John Appleseed", "age": 45} and a received query predicate includes:

src:id=45

In this example, if the path (i.e., "/id/" or "/age/") is not used when indexing and matching, the same values will be treated in the same way and will result in the same hashes. This can be problematic in example instances in which there are sender-receiving IP addresses or the same numeric values in multiple fields. Even if the "id" was different from 45, a pruning index look-up would still identify "45" because it is present in the "age" field. To address the challenges illustrated by this example, a token is generated based on a full absolute path of the data, as mentioned above.

Table 1, presented below, lists example indexing transformations that can be generated for multiple input data types.

TABLE 1

| Input data type | Indexing transformation |
| --- | --- |
| FIXED | FIXED → REAL |
|  | FIXED → FIXED |
|  | (PRECISION, SCALE) |
|  | TEXT |
| REAL | REAL |
|  | REAL → FIXED |
|  | TEXT |
| TEXT | TEXT |
|  | TEXT → NUMBER |
|  | (PRECISION, SCALE) |
|  | DATE |
|  | TIME |
|  | TIMESTAMP |

TABLE 1-continued

| Input data type | Indexing transformation |
| --- | --- |
| DATE | DATE |
|  | TEXT |
| TIME | TIME |
|  | TEXT |
| TIMESTAMP_NTZ | TIMESTAMP_NTZ |
| TIMESTAMP_LTZ | TEXT |
| TIMESTAMP_TZ |  |
| BOOLEAN | FIXED |
|  | TEXT |
| NULL_VALUE | NULL_VALUE |
| ARRAY | PATH |
| OBJECT | PATH |

With specific reference to FIXED and REAL data types, after parsing number input, values can be stored as fixed point (LogicalType::FIXED) or real (LogicalType::REAL) objects. As shown in Table 1, for FIXED input data types, the compute service manager 108 applies a FIXED to REAL transformation. The output value of REAL data type is stabilized and indexed. Additionally, a FIXED to FIXED (precision, scale) transformation is performed, in which the output FIXED data type has a different precision or scale (e.g., 0) than the input. Although this may reduce precision, this enables matching against all valid NUMBER (precision, scale) casts. A FIXED to TEXT transformation is also performed to enable string matching. For REAL input data types, the REAL value is stabilized and indexed if it is in the range of FIXED data type. In instances in which the value is out-of-range (e.g., 1e+50), the value may be discarded from indexing. A REAL to FIXED transformation is also performed and out-of-range REAL values are discarded. As with FIXED data types, a REAL to TEXT transformation is performed to enable exact string matching.

With reference to TEXT data types, textual data is indexed as text for exact string matching. Other data types such as DATE, TIME, and TIMESTAMP can be stored as TEXT values. Thus, in order to allow predicates on these data types, the compute service manager 108 may attempt casting textual data to each of these data types and keep successful conversions as indexing transformations.

Consistent with some embodiments, the network-based database system 102 can store DATA, TIME, and TIMESTAMP data types in TEXT values. These data types can, however, be present in semi-structured data type columns of tables coming from external scans. When converting valid timestamp strings (and objects) into:

TIMESTAMP_NTZ=>The output will not contain a time zone. Even if the converted string has its own timezone, it is discarded.

TIMESTAMP_LTZ=>The output will have a local timezone attached. If the converted string does not have a timezone, the compute service manager 108 may add the local timezone. If the string already has a timezone, the compute service manager 108 may first apply the existing timezone, then attach to the local timezone.

TIMESTAMP_TZ=>There is a source local timezone but it is not used during computations. If the converted string does not have a timezone, the compute service manager 108 may add the local timezone. If the string already has a timezone, that timezone is used.

Assume STRING=DATE+[TIME]+[TZ] where current local timezone is LTZ. Then:

STRING→TIMESTAMP_NTZ=>DATE+[TIME]
STRING→TIMESTAMP_TZ=>DATE+[TIME]+
(TZ=Ø? LTZ:TZ)
STRING→TIMESTAMP_LTZ=>DATE+[TZ=Ø? TIME: TIME+TZ−LTZ]+LTZ

TABLES 2 and 3 presented below provide examples of the forgoing formula as applied to GMT-08:00 pacific time.

TABLE 2

| STRING object without timezone information | |
| --- | --- |
| '2021 Jan. 1 23:00:00'::variant::timestamp_ntz; | Fri, 01 Jan 2021 23:00:00 +0000 |
| '2021 Jan. 1 23:00:00'::variant::timestamp_tz; | Fri, 01 Jan 2021 23:00:00 −0800 |
| '2021 Jan. 1 23:00:00'::variant::timestamp_ltz; | Fri, 01 Jan 2021 23:00:00 −0800 |

TABLE 3

| STRING object with timezone information | |
| --- | --- |
| '2021 Jan. 1 23:00:00 − 1200'::variant::timestamp_ntz; | Fri, 01 Jan 2021 23:00:00 +0000 |
| '2021 Jan. 1 23:00:00 − 1200'::variant::timestamp_tz; | Fri, 01 Jan 2021 23:00:00 −1200 |
| '2021 Jan. 1 23:00:00 − 1200'::variant::timestamp_ltz; | Sat, 02 Jan 2021 03:00:00 −0800 |

Attempting to cast a STRING into all TIMESTAMP types can be very costly. Therefore, it can be more efficient to cast into only one type and gather hashes from that type. For example, it can be more efficient to cast a STRING into TIMESTAMP_TZ type since there are valid STRINGs that are convertible to TIMESTAMP_TZ, but not any other TIMESTAMP type. If the indexed STRING has its own time zone information (e.g., "1970-01-01 03:25:45.000000000Ztz=1440"), casting this STRING into DATE, TIMESTAMP_NTZ or TIMESTAMP_LTZ will fail, but the cast to TIMESTAMP_TZ will succeed. This approach can be advantageous because it does not carry any risk of missing potential successful casts from TEXT to TIMESTAMP types.

As noted by TABLE 1, indexing transformations for BOOLEAN data types correspond to FIXED and TEXT data types. For the BOOLEAN to FIXED transformation, the only possible values are '0' and '1'. For the BOOLEAN to TEXT transformation, the only possible values are "true" and "false."

With returned reference to FIG. 10, at operation 1030, the compute service manager 108 generates a set of fingerprints for values in the column based on the corresponding indexing transformation(s) generated for the values. That is, the compute service manager 108 generates a set of fingerprints for a given value based on the one or more indexing transformations generated for the value. As noted above in reference to operation 905, the set of fingerprints generated for each value in the column are used to generate a filter in the pruning index that corresponds to the column.

The compute service manager 108 can, in some instances, generate a fingerprint for a given value by computing a hash over an indexing transformation of the value or over the value itself. In other words, the set of fingerprints generated for a given value can include one or more fingerprints generated by computing a hash over an indexing transformation and a fingerprint generated by computing a hash over the value itself.

As discussed above, for complex data types such as ARRAY and OBJECT, the indexing transformation corresponds to a token that indicates the path (corresponding to an ARRAY or OBJECT data type) is not specifically indexed. In generating a fingerprint for such complex data types, the compute service manager 108 may compute a first hash over the path and compute a second hash over a token using the first hash as a seed to produce the fingerprint for the data. In some example embodiments, the hash function xxHash( ) is used to compute the hashes, though it shall be appreciated that any one of many known hashing techniques and functions can be used. In a first example, the compute service manager 108 can generate a fingerprint for any data type within a semi-structured data object as follows:

XxHash(<constant>, <seed>=<hash_of_the_path>)

In a second example, the compute service manager 108 can generate a fingerprint for a complex data type as follows:

XxHash(XxHash(<constant>, <hash_of_the_path>), PRIME_NUMBER)

In a third example, the compute service manager 108 can generate a fingerprint for a complex data type as follows:

XxHash(XxHashCombine(<constant>, <seed>=PRIME_NUMBER, <intermediate>=<hash_of_the_path>), PRIME_NUMBER)

Figure 11:
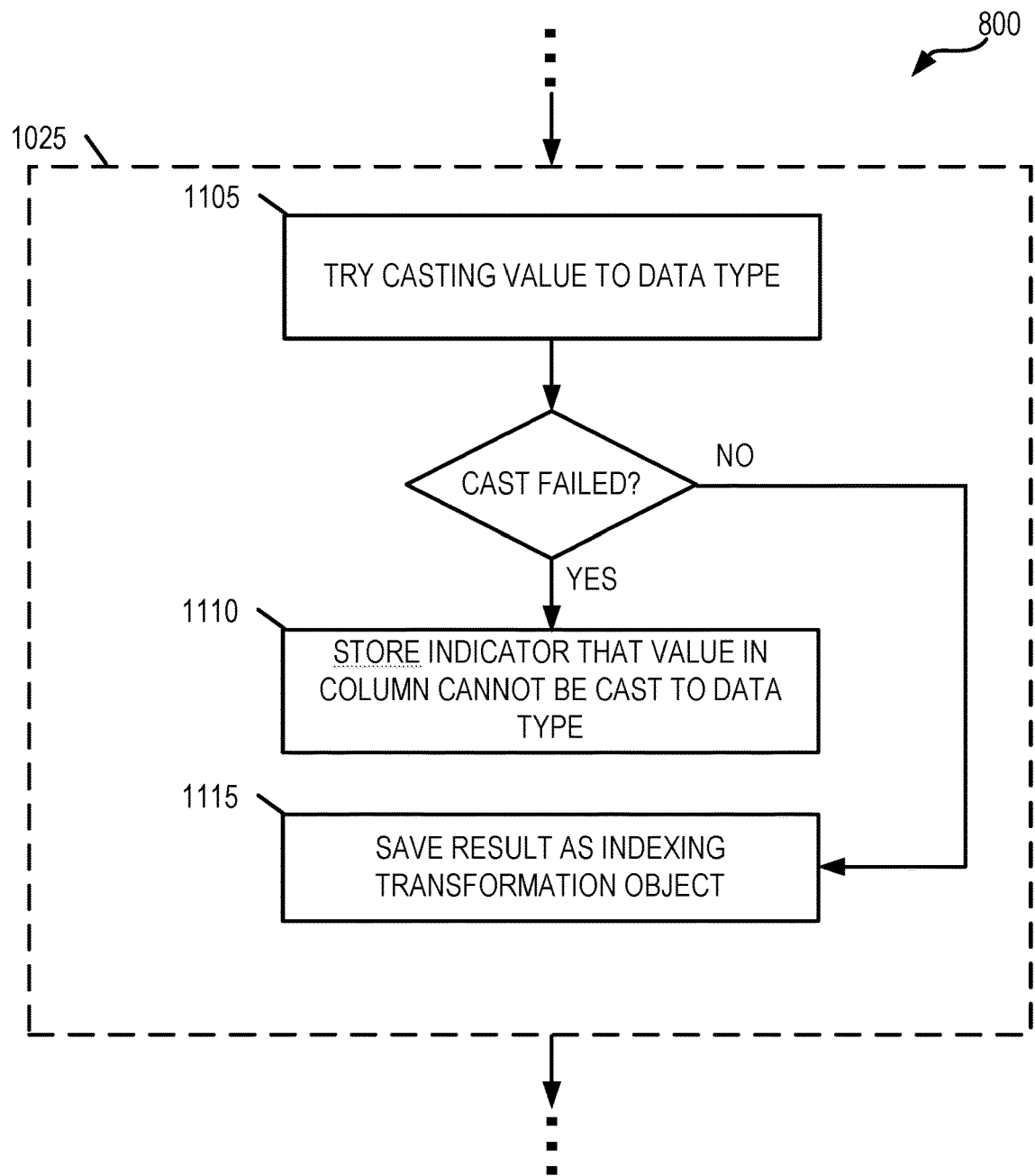

As shown in FIG. 11, the operation 1025 of method 800 may, in some embodiments, include (e.g., as sub-operations or a sub-routine) operations 1105, 1110, and 1115. At operation 1105, the compute service manager 108 tries to cast a value in the semi-structured data type column to a stored data type. That is, the compute service manager 108 attempts to convert the value to the stored data type using a SQL cast function. The value can be the first value in the column processed by the compute service manager 108.

If the cast fails, the compute service manager 108 stores an indicator to indicate that values in the column cannot be cast to that particular data type, at operation 1110. That is, an indicator is stored to indicate that the values in the column are unable to be converted to the data type in response to a failed attempt to convert the value to the data type. In an example, the compute service manager 108 can insert a token in the pruning index that indicates that values in the column cannot be cast to a particular data type. As the compute service manager 108 traverses additional values in the column in generating a filter for the column in the pruning index, the stored token causes the compute service manager 108 to avoid further attempts at casting values in the column to the data type for which the casting failed. If the cast is successful, the compute service manager 108 saves a result of the cast as an indexing transformation for the value, at operation 1115, and a fingerprint may subsequently be generated based on the indexing transformation, as described above. The compute service manager 108 casts the remaining values in the column to the data types for which the cast is successful.

Although only a single data type is addressed above, it shall be appreciated that this process can be repeated for each supported data type. That is, the compute service manager 108 can try to cast the value in the column to each of multiple different supported data types. In this manner, the compute service manager 108 can learn to which data types values in the column can be cast based on which data types the first value in the column can be cast to, and the compute service manager 108 can avoid attempting to cast the remaining values in the column to data types that they cannot be cast to.

Figure 12:
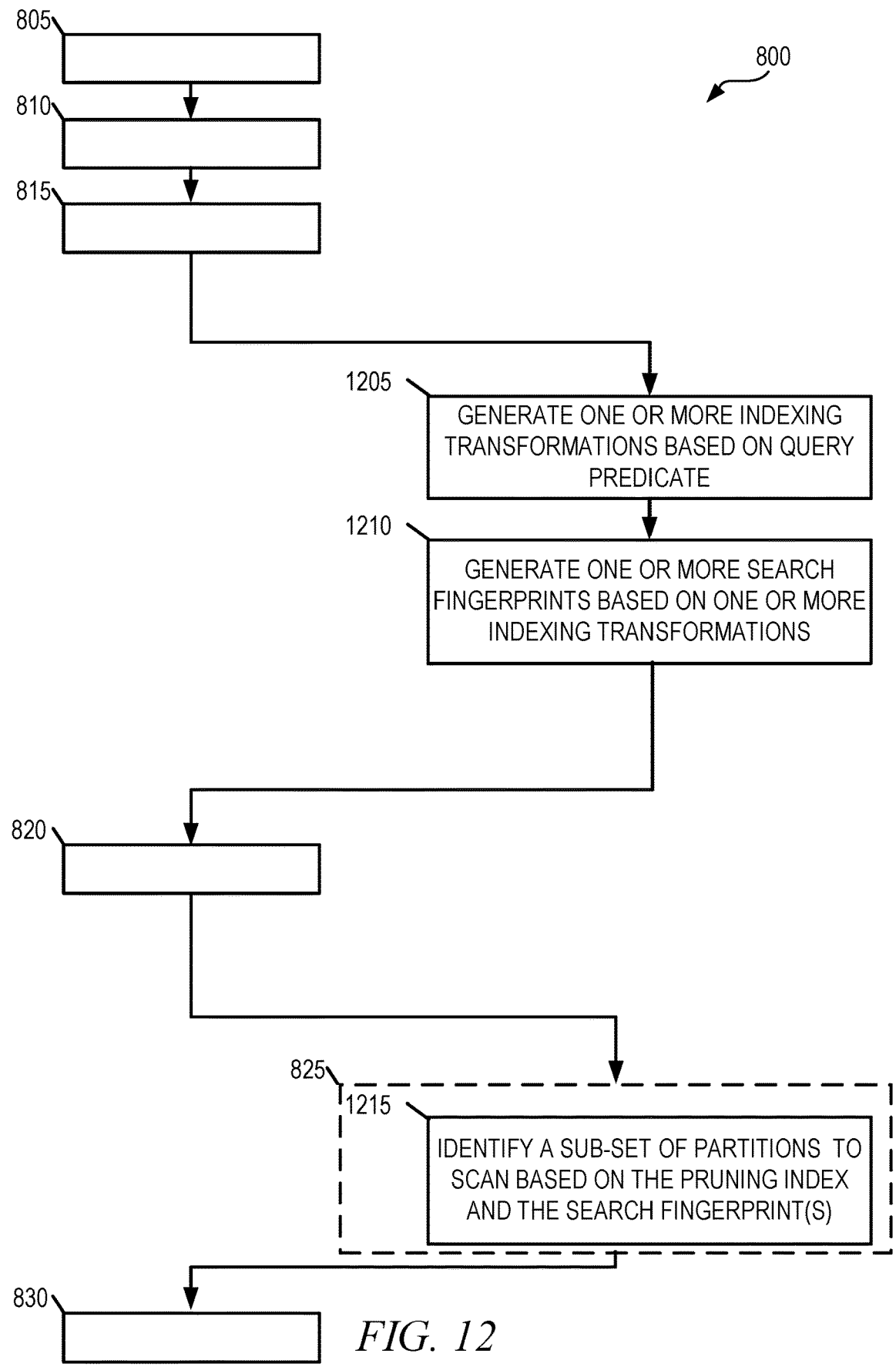

As shown in FIG. 12, the method 800 may further include operations 1205, 1210, and 1215. As shown, the operations 1205 and 1210 can, in some embodiments, be performed subsequent to the operation 815 where the query directed to the source table is received. Consistent with these embodiments, the query can include a predicate on a semi-structured data type column. At operation 1205, the compute service manager 108 generates one or more indexing transformations based on the query predicate. Similar to the indexing transformations generated for the values in the semi-structured column, the compute service manager 108 can generate an indexing transformation for the query predicate by executing a cast function over one or more values in the predicate. That is, the compute service manager 108 can use the cast function to convert a value in the query predicate from a first data type to a second data type or to the same data type, but with a different precision and/or scale. In some instances, the value itself can be used as an indexing transformation without casting the value to a different data type.

For predicates such as IS_NOT_NULL (<semi-structured_data_type_field>), the argument semi-structured data field can correspond to both internal and leaf nodes, meaning that there is no information about the existence of the path. Thus, the compute service manager 108 cannot simply infer whether this path in fact contains a primitive value or represents an OBJECT or ARRAY data type. Therefore, the compute service manager 108 creates an IN predicate as follows:

(<semi-structured_data_type_field> indexed as LEAF node)

or (<semi-structured_data_type_field> indexed as INTERNAL node)

Accordingly, the compute service manager 108 generates two constants—one for the leaf path and one for the internal path hash. These final constants can be fed into the IN predicate.

To address IN predicates in the following form: <semi-structured_data_type_field> in (C1, C2, . . . , Cn), the semi-structured data type field can be interpreted without any Cast( ) functions when the constants C1, C2, . . . Cn are numbers. Otherwise, the compute service manager 108 can unwrap the Cast for each constant separately.

If the constant to match against is a STRING data type, two constants are created. More specifically, a first constant corresponds to the constant itself without any transformations, and a second constant corresponds to a token that indicates that the input might represent an ARRAY or an OBJECT. In an example, a query predicate includes " . . . where name='["John"]';". In this example, the square bracket can either be part of the input string or can present an ARRAY. Hence, both situations are accounted for in the approach described above. In a general case where there are no bracket symbols present in the input string, only the first constant is created.

At operation 1210, the compute service manager 108 generates a set of search fingerprints based on the one or more indexing transformations. As with the fingerprints generated for the searchable values in the semi-structured column, the compute service manager 108 generates a fingerprint for the query predicate by computing a hash over an indexing transformation generated for the query predicate.

As shown, the operation 1215 can be performed as part of the operation 825 where the compute service manager 108 prunes the scan set. At operation 1215, the compute service manager 108 identifies a subset of partitions to scan based on the pruning index and the search fingerprints. The compute service manager 108 can identify the subset by comparing the set of search fingerprints to values included in the pruning index (e.g., fingerprints of indexing transformations of stored data values in the source table) and identifying one or more values in the pruning index that match one or more search fingerprints. Specifically, the compute service manager 108 identifies one or more micro-partitions that potentially store data that satisfies the query based on fingerprints in the pruning index that match search fingerprint(s). That is, a fingerprint (e.g., hash value computed based on an indexing transformations of semi-structured data value) in the pruning index that matches a search fingerprint generated from an indexing transformation of the query predicate (e.g., a hash value computed based on the indexing transformation) indicates that matching data is potentially stored in a corresponding column of the micro-partition. The corresponding micro-partition can be identified by the compute service manager 108 based on the matching fingerprint in the pruning index.

Figure 13:
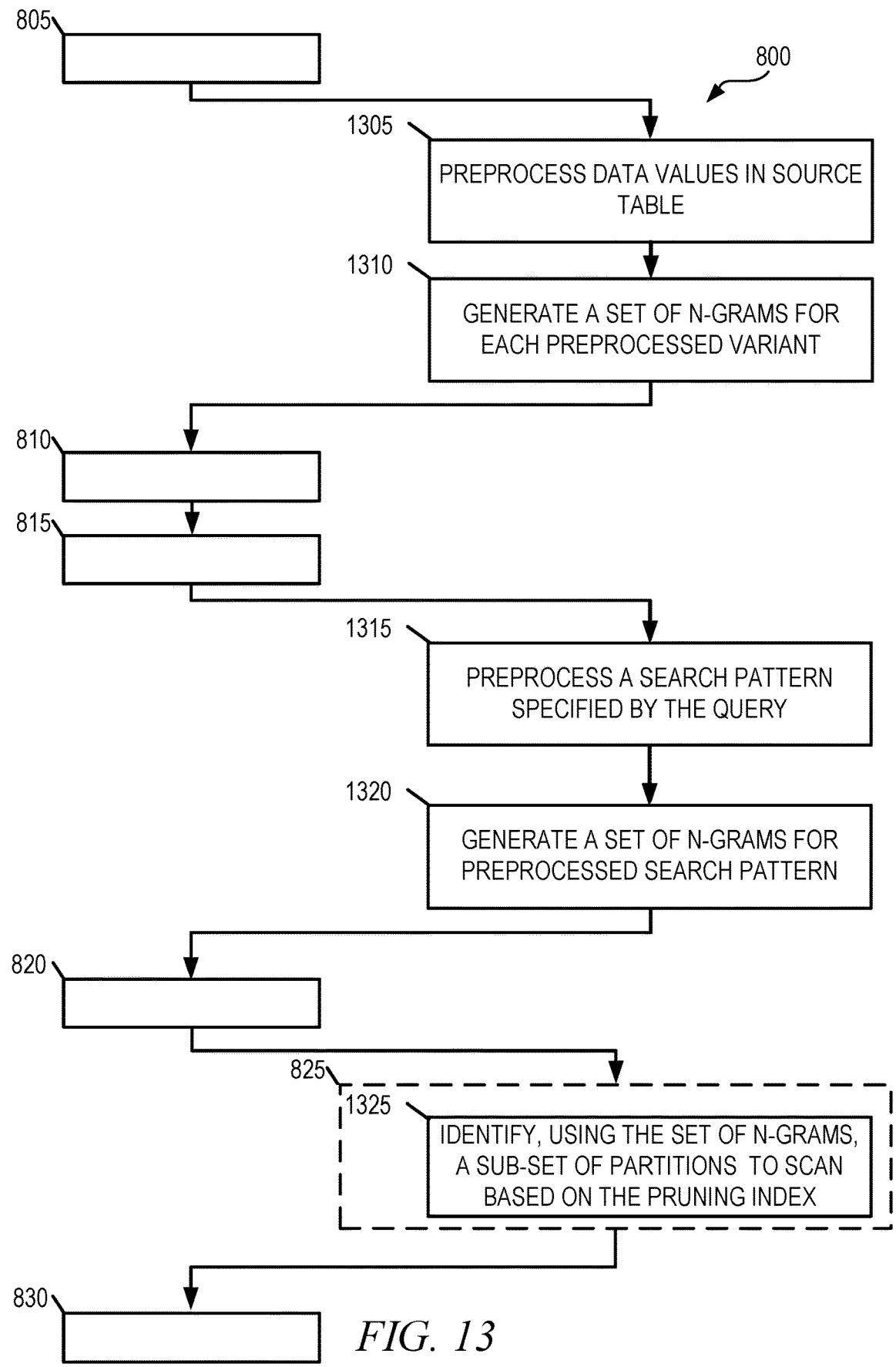

As shown in FIG. 13, the method 800 may, in some embodiments, include operations 1305, 1310, 1315, 1320, and 1325. Consistent with these embodiments, the operations 1305 and 1310 may be performed prior to operation 810 where the compute service manager 108 generates the pruning index for the source table. At operation 1305, the compute service manager 108 preprocesses the data values in the cells of the source table. In preprocessing a given data value, the compute service manager 108 generates one or more preprocessed variants of the data value. In performing the preprocessing, the compute service manager performs one or more normalization operations to a given data value. The compute service manager 108 can utilize one of several known normalization techniques to normalize data values.

For a given data value, the preprocessing performed by the compute service manager 108 can include, for example, any one or more of: generating a case-agnostic variant (e.g., by converting uppercase characters to lowercase characters), generating one or more misspelled variants based on common or acceptable misspellings of the data value, and generating one or more synonymous variants corresponding to synonyms of the data value. In general, in generating a preprocessed variant (e.g., case-agnostic variant, misspelled variant, a synonymous variant or a variant with special characters to indicate a start and end to a data value), the compute service manager 108 uses a common knowledge base to transform a data value into one or more permutations of the original data value.

As an example of the foregoing, the string "Bob" can be transformed into the case-agnostic variant "bob." As another example, the preprocessed variants of "bob" "bbo" and "obb" can be generated for the string "Bob" to account for misspellings.

At operation 1310, the compute service manager 108 generates a set of N-grams for each preprocessed variant. An N-gram in this context refers to a contiguous sequence of N-items (e.g., characters or words) in a given value. For a given preprocessed variant of a data value in the source table, the compute service manager 108 transforms the value into multiple segments of equal length. For example, for a string, the compute service manager 108 can transform the string into multiple sub-strings of N characters.

Depending on the embodiment, the value of N can be predetermined or dynamically computed at the time of generating the pruning index. In embodiments in which the value of N is precomputed, the compute service manager 108 determines an optimal value for N based on a data type of values in the source table. In some embodiments, multiple values of N can be used. That is, a first subset of N-grams can be generated using a first value for N and a second subset of N-grams can be created using a second value of N.

Consistent with these embodiments, the operations 1315 and 1320 can be performed prior to operation 820 where the compute service manager 108 prunes the scan set using the pruning index. At operation 1315, the compute service manager 108 preprocesses a search pattern included in the query. In preprocessing the search pattern, the compute service manager 108 performs the same preprocessing operations that are performed on the data values in the source table at 1305 to ensure that the characters of the search pattern fit the pruning index. Hence, in preprocessing the search pattern, the compute service manager 108 can perform any one or more of: generating a case-agnostic variant of the search pattern (e.g., by converting uppercase characters to lowercase characters), generating one or more misspelled variants based on common or acceptable misspellings of the search pattern, generating one or more synonymous variants corresponding to synonyms of the search pattern, and generating a variant that includes special characters to mark a start and end of the search pattern. In preprocessing a given pattern, the compute service manager 108 can generate one or more preprocessed variants of the search pattern. For example, the compute service manager 108 can generate any one or more of: a case-agnostic variant, misspelled variant, or a synonymous variant for the search pattern. As a further example, the compute service manager 108 can generate a variant that includes special characters to indicate a start and end of a search pattern (e.g., "^testvalue$" for the search pattern "testvalue").

At operation 1320, the compute service manager 108 generates a set of N-grams for the search pattern based on the one or more preprocessed variants of the search pattern. The compute service manager 108 uses the same value for N that was used to generate the pruning index. In embodiments in which the compute service manager 108 uses multiple values for N in generating the pruning index, the compute service manager 108 uses the same values for generating the set of N-grams for the search pattern.

In an example, the query includes the following statement:
WHERE a TLIKE '% LoremIpsum % Dolor % Sit % Amet'
In this example, '% LoremIpsum % Dolor % Sit % Amet' is the search pattern and in preprocessing the search pattern, the compute service manager 108 converts the search pattern to all lower case to create a case-agnostic variant: '% loremipsum % dolor % sit % amet'. The compute service manager 108 splits the search pattern into segments at the wild card positions, which, in this example, produces the following sub-strings: "loremipsum," "dolor," "sit," and "amet." Based on these sub-strings, the compute service manager 108 generates the following set of N-grams:
Set ["lorem", "oremi", "remip", "emips", "mipsu", "ipsum", "dolor"]
In this example N is 5, and thus the compute service manager 108 discards the sub-strings "sit" and "amet" as their length is less than 5.

As shown, consistent with these embodiments, the operation 1325 can be performed as part of the operation 825 where the compute service manager 108 prunes the scan set using the pruning index. At operation 1325, the compute service manager 108 uses the set of N-grams generated based on the search pattern to identify a subset of micro-partitions of the source table to scan based on the pruning index. The compute service manager 108 may identify the subset of micro-partitions by generating a set of fingerprints based on the set of N-grams (e.g., by computing a hash for each N-gram), comparing the set of fingerprints to values included in the pruning index (e.g., fingerprints of stored data values in the source table), and identifying one or more values in the pruning index that match one or more fingerprints in the set of fingerprints generated based on the N-grams of the search pattern. Specifically, the compute service manager 108 identifies one or more micro-partitions that potentially store data that satisfies the query based on fingerprints of data values in the pruning index that match fingerprints in the set of fingerprints computed for the search pattern. That is, a fingerprint (e.g., hash value computed based on an N-gram of a preprocessed stored data value in the source table) in the pruning index that matches a fingerprint generated from an N-gram of the search pattern (e.g., a hash value computed based on the N-gram) indicates that matching data is potentially stored in a corresponding column of the micro-partition because the N-gram generated from the search pattern is stored in the column of the micro-partition. The corresponding micro-partition can be identified by the compute service manager 108 based on the matching fingerprint in the pruning index. Consistent with some embodiments, in identifying the subset of micro-partitions, the compute service manager 108 uses the pruning index to identify any micro-partitions that contain any one of the fingerprints generated from the search pattern N-grams, and from these micro-partitions, the compute service manager 108 then identifies the micro-partitions that contain all of the N-grams. That is, the compute service manager 108 uses the pruning index to identify a subset of micro-partitions that contain data matching all fingerprints generated based on the N-grams of the search pattern. For example, given fingerprints f1, f2, and f3, the compute service manager 108 uses the pruning index to determine: a first micro-partition and second micro-partition contain data corresponding to f1; the second micro-partition and a third micro-partition contain data corresponding to f2; and the first, second, and third micro-partition contain data corresponding to B. In this example, the compute service manager 108 selects only the second micro-partition for scanning based on the second micro-partition containing data that corresponds to all three fingerprints.

Figure 14:
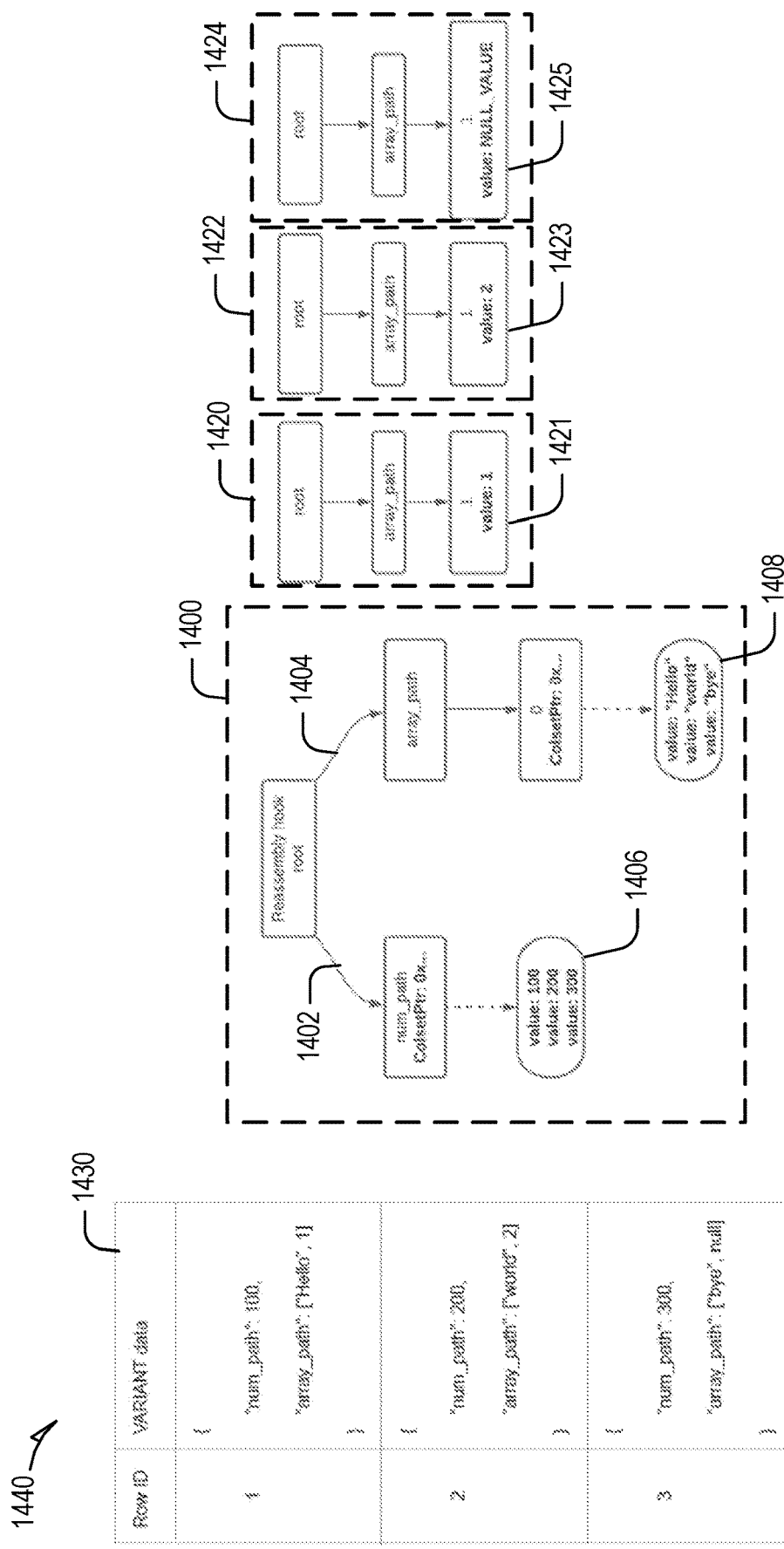
FIG. 14 is a conceptual diagram illustrating an example reassembly hook object and example residual objects, in accordance with some embodiments of the present disclosure.

FIG. 14 illustrates an example reassembly hook object 1400 and example residual objects 1420, 1422, and 1424 that correspond to semi-structured data in a column 1430 of a table 1440. In this example, the reassembly hook object 1400 comprises a tree structure that represents a subcolumnarized portion of the semi-structured data in column 1430. As shown, the tree structure includes a branch 1402 that corresponds to a first subcolumnarized path—"num_path"—and a branch 1404 that corresponds to a second subcolumnarized path—"array_path." The branch 1402 includes a leaf node 1406 that includes a pointer to primitive values for "num_path" and the branch 1404 includes a leaf node 1408 that includes a pointer to primitive values for "array_path."

The residual objects 1420, 1422, and 1424 correspond to a non-subcolumnarized portion of the semi-structured data. Each of the residual objects 1420, 1422, and 1424 comprise a data structure corresponding to a portion of the non-subcolumnarized portion of the semi-structured data. Each of the residual objects include a leaf node comprising a primitive value corresponding to a portion of the non-subcolumnarized portion of the semi-structured data. For example, as shown, the residual object 1420 includes leaf node 1421, the residual object 1422 includes leaf node 1423, and the residual object 1424 includes leaf node 1425.

Figure 15:
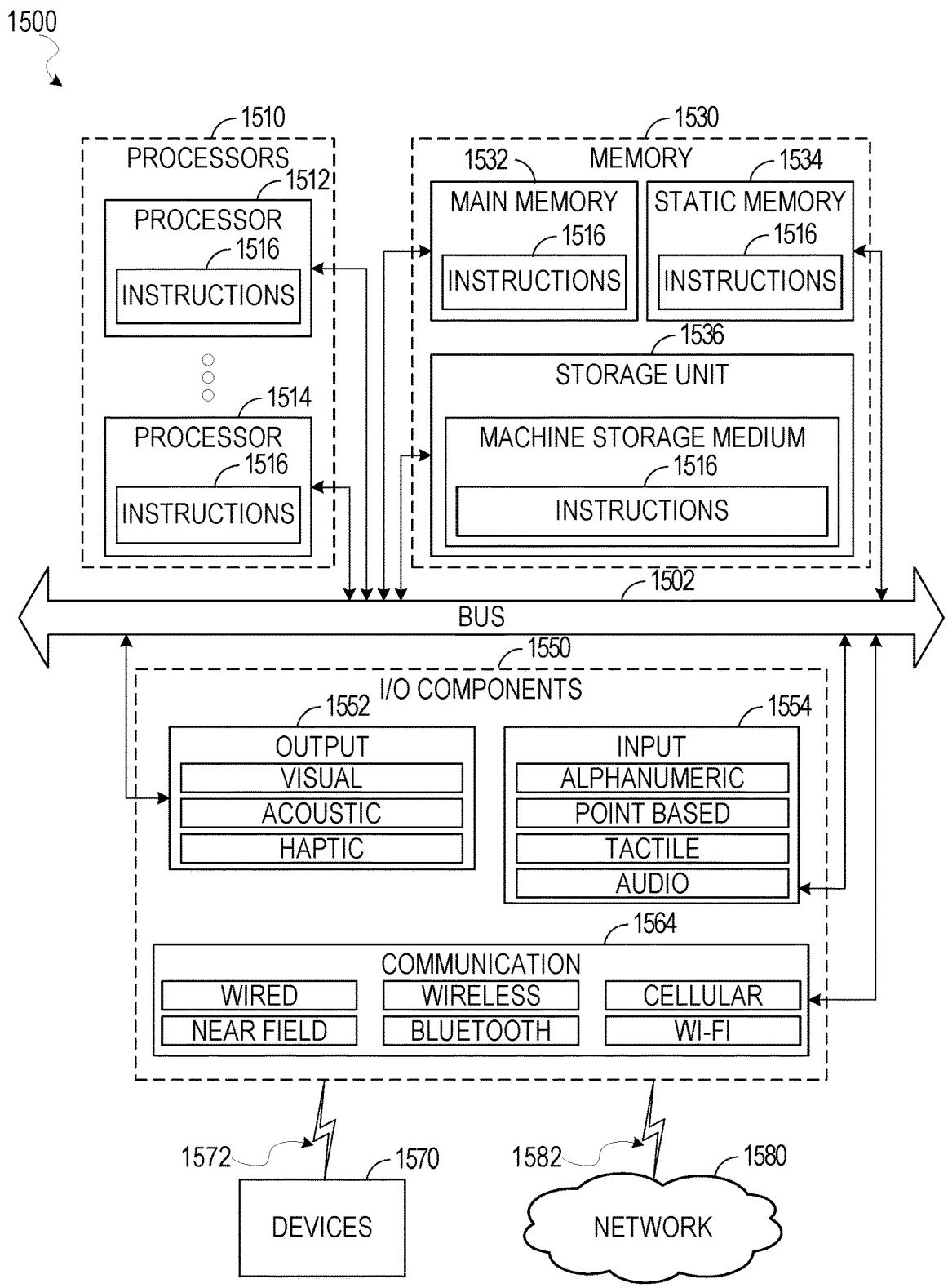
FIG. 15 illustrates a diagrammatic representation of a machine in the form of a computer system within which a set of instructions may be executed for causing the machine to perform any one or more of the methodologies discussed herein, in accordance with some embodiments of the present disclosure.

FIG. 15 illustrates a diagrammatic representation of a machine 1300 in the form of a computer system within which a set of instructions may be executed for causing the machine 1500 to perform any one or more of the methodologies discussed herein, according to an example embodiment. Specifically, FIG. 15 shows a diagrammatic representation of the machine 1500 in the example form of a computer system, within which instructions 1516 (e.g., software, a program, an application, an applet, an app, or other executable code) for causing the machine 1500 to perform any one or more of the methodologies discussed herein may be executed. For example, the instructions 1516 may cause the machine 1500 to execute any one or more operations of any one or more of the method 800. As another example, the instructions 1516 may cause the machine 1500 to implement portions of the functionality illustrated in any one or more of FIGS. 4-8. In this way, the instructions 1516 transform a general, non-programmed machine into a particular machine 1500 (e.g., the compute service manager 108, the execution platform 110, and the data storage devices 206) that is specially configured to carry out any one of the described and illustrated functions in the manner described herein.

In alternative embodiments, the machine 1500 operates as a standalone device or may be coupled (e.g., networked) to other machines. In a networked deployment, the machine 1500 may operate in the capacity of a server machine or a client machine in a server-client network environment, or as a peer machine in a peer-to-peer (or distributed) network environment. The machine 1500 may comprise, but not be limited to, a server computer, a client computer, a personal computer (PC), a tablet computer, a laptop computer, a netbook, a smart phone, a mobile device, a network router, a network switch, a network bridge, or any machine capable of executing the instructions 1516, sequentially or otherwise, that specify actions to be taken by the machine 1500. Further, while only a single machine 1500 is illustrated, the term "machine" shall also be taken to include a collection of machines 1500 that individually or jointly execute the instructions 1516 to perform any one or more of the methodologies discussed herein.

The machine 1500 includes processors 1510, memory 1530, and input/output (I/O) components 1550 configured to communicate with each other such as via a bus 1502. In an example embodiment, the processors 1510 (e.g., a central processing unit (CPU), a reduced instruction set computing (RISC) processor, a complex instruction set computing (CISC) processor, a graphics processing unit (GPU), a digital signal processor (DSP), an application-specific integrated circuit (ASIC), a radio-frequency integrated circuit (RFIC), another processor, or any suitable combination thereof) may include, for example, a processor 1512 and a processor 1514 that may execute the instructions 1516. The term "processor" is intended to include multi-core processors 1510 that may comprise two or more independent processors (sometimes referred to as "cores") that may execute instructions 1516 contemporaneously. Although FIG. 15 shows multiple processors 1510, the machine 1500 may include a single processor with a single core, a single processor with multiple cores (e.g., a multi-core processor), multiple processors with a single core, multiple processors with multiple cores, or any combination thereof.

The memory 1530 may include a main memory 1532, a static memory 1534, and a storage unit 1536, all accessible to the processors 1510 such as via the bus 1502. The main memory 1532, the static memory 1534, and the storage unit 1536 store the instructions 1516 embodying any one or more of the methodologies or functions described herein. The instructions 1516 may also reside, completely or partially, within the main memory 1532, within the static memory 1534, within the storage unit 1536, within at least one of the processors 1510 (e.g., within the processor's cache memory), or any suitable combination thereof, during execution thereof by the machine 1500.

The I/O components 1550 include components to receive input, provide output, produce output, transmit information, exchange information, capture measurements, and so on. The specific I/O components 1550 that are included in a particular machine 1500 will depend on the type of machine. For example, portable machines such as mobile phones will likely include a touch input device or other such input mechanisms, while a headless server machine will likely not include such a touch input device. It will be appreciated that the I/O components 1550 may include many other components that are not shown in FIG. 15. The I/O components 1550 are grouped according to functionality merely for simplifying the following discussion and the grouping is in no way limiting. In various example embodiments, the I/O components 1550 may include output components 1552 and input components 1554. The output components 1552 may include visual components (e.g., a display such as a plasma display panel (PDP), a light emitting diode (LED) display, a liquid crystal display (LCD), a projector, or a cathode ray tube (CRT)), acoustic components (e.g., speakers), other signal generators, and so forth. The input components 1554 may include alphanumeric input components (e.g., a keyboard, a touch screen configured to receive alphanumeric input, a photo-optical keyboard, or other alphanumeric input components), point-based input components (e.g., a mouse, a touchpad, a trackball, a joystick, a motion sensor, or another pointing instrument), tactile input components (e.g., a physical button, a touch screen that provides location and/or force of touches or touch gestures, or other tactile input components), audio input components (e.g., a microphone), and the like.

Communication may be implemented using a wide variety of technologies. The I/O components 1550 may include communication components 1564 operable to couple the machine 1500 to a network 1580 or devices 1570 via a coupling 1582 and a coupling 1572, respectively. For example, the communication components 1564 may include a network interface component or another suitable device to interface with the network 1580. In further examples, the communication components 1564 may include wired communication components, wireless communication components, cellular communication components, and other communication components to provide communication via other modalities. The devices 1570 may be another machine or any of a wide variety of peripheral devices (e.g., a peripheral device coupled via a universal serial bus (USB)). For example, as noted above, the machine 1500 may correspond to any one of the compute service manager 108 and the execution platform 110, and the devices 1570 may include the data storage device 206 or any other computing device described herein as being in communication with the network-based database system 102 or the storage platform 104.

The various memories (e.g., 1530, 1532, 1534, and/or memory of the processor(s) 1510 and/or the storage unit 1536) may store one or more sets of instructions 1516 and data structures (e.g., software) embodying or utilized by any one or more of the methodologies or functions described herein. These instructions 1516, when executed by the processor(s) 1510, cause various operations to implement the disclosed embodiments.

As used herein, the terms "machine-storage medium," "device-storage medium," and "computer-storage medium" mean the same thing and may be used interchangeably in this disclosure. The terms refer to a single or multiple storage devices and/or media (e.g., a centralized or distributed database, and/or associated caches and servers) that store executable instructions and/or data. The terms shall accordingly be taken to include, but not be limited to, solid-state memories, and optical and magnetic media, including memory internal or external to processors. Specific examples of machine-storage media, computer-storage media, and/or device-storage media include non-volatile memory, including by way of example semiconductor memory devices, e.g., erasable programmable read-only memory (EPROM), electrically erasable programmable read-only memory (EEPROM), field-programmable gate arrays (FPGAs), and flash memory devices; magnetic disks such as internal hard disks and removable disks; magneto-optical disks; and CD-ROM and DVD-ROM disks. The terms "machine-storage media," "computer-storage media," and "device-storage media" specifically exclude carrier waves, modulated data signals, and other such media, at least some of which are covered under the term "signal medium" discussed below.

In various example embodiments, one or more portions of the network 1580 may be an ad hoc network, an intranet, an extranet, a virtual private network (VPN), a local-area network (LAN), a wireless LAN (WLAN), a wide-area network (WAN), a wireless WAN (WWAN), a metropolitan-area network (MAN), the Internet, a portion of the Internet, a portion of the public switched telephone network (PSTN), a plain old telephone service (POTS) network, a cellular telephone network, a wireless network, a Wi-Fi® network, another type of network, or a combination of two or more such networks. For example, the network 1580 or a portion of the network 1580 may include a wireless or cellular network, and the coupling 1582 may be a Code Division Multiple Access (CDMA) connection, a Global System for Mobile communications (GSM) connection, or another type of cellular or wireless coupling. In this example, the coupling 1582 may implement any of a variety of types of data transfer technology, such as Single Carrier Radio Transmission Technology (1×RTT), Evolution-Data Optimized (EVDO) technology, General Packet Radio Service (GPRS) technology, Enhanced Data rates for GSM Evolution (EDGE) technology, third Generation Partnership Project (3GPP) including 3G, fourth generation wireless (4G) networks, Universal Mobile Telecommunications System (UMTS), High-Speed Packet Access (HSPA), Worldwide Interoperability for Microwave Access (WiMAX), Long Term Evolution (LTE) standard, others defined by various standard-setting organizations, other long-range protocols, or other data transfer technology.

The instructions 1516 may be transmitted or received over the network 1580 using a transmission medium via a network interface device (e.g., a network interface component included in the communication components 1564) and utilizing any one of a number of well-known transfer protocols (e.g., hypertext transfer protocol (HTTP)). Similarly, the instructions 1516 may be transmitted or received using a transmission medium via the coupling 1572 (e.g., a peer-to-peer coupling) to the devices 1570. The terms "transmission medium" and "signal medium" mean the same thing and may be used interchangeably in this disclosure. The terms "transmission medium" and "signal medium" shall be taken to include any intangible medium that is capable of storing, encoding, or carrying the instructions 1516 for execution by the machine 1500, and include digital or analog communications signals or other intangible media to facilitate communication of such software. Hence, the terms "transmission medium" and "signal medium" shall be taken to include any form of modulated data signal, carrier wave, and so forth. The term "modulated data signal" means a signal that has one or more of its characteristics set or changed in such a manner as to encode information in the signal.

The terms "machine-readable medium," "computer-readable medium," and "device-readable medium" mean the same thing and may be used interchangeably in this disclosure. The terms are defined to include both machine-storage media and transmission media. Thus, the terms include both storage devices/media and carrier waves/modulated data signals.

The various operations of example methods described herein may be performed, at least partially, by one or more processors that are temporarily configured (e.g., by software) or permanently configured to perform the relevant operations. Similarly, the methods described herein may be at least partially processor-implemented. For example, at least some of the operations of the method 800 may be performed by one or more processors. The performance of certain of the operations may be distributed among the one or more processors, not only residing within a single machine, but also deployed across a number of machines. In some example embodiments, the processor or processors may be located in a single location (e.g., within a home environment, an office environment, or a server farm), while in other embodiments the processors may be distributed across a number of locations.

Although the embodiments of the present disclosure have been described with reference to specific example embodiments, it will be evident that various modifications and changes may be made to these embodiments without departing from the broader scope of the inventive subject matter. Accordingly, the specification and drawings are to be regarded in an illustrative rather than a restrictive sense. The accompanying drawings that form a part hereof show, by way of illustration, and not of limitation, specific embodiments in which the subject matter may be practiced. The embodiments illustrated are described in sufficient detail to enable those skilled in the art to practice the teachings disclosed herein. Other embodiments may be used and derived therefrom, such that structural and logical substitutions and changes may be made without departing from the scope of this disclosure. This Detailed Description, therefore, is not to be taken in a limiting sense, and the scope of various embodiments is defined only by the appended claims, along with the full range of equivalents to which such claims are entitled.

Such embodiments of the inventive subject matter may be referred to herein, individually and/or collectively, by the term "invention" merely for convenience and without intending to voluntarily limit the scope of this application to any single invention or inventive concept if more than one is in fact disclosed. Thus, although specific embodiments have been illustrated and described herein, it should be appreciated that any arrangement calculated to achieve the same purpose may be substituted for the specific embodiments shown. This disclosure is intended to cover any and all adaptations or variations of various embodiments. Combinations of the above embodiments, and other embodiments not specifically described herein, will be apparent, to those of skill in the art, upon reviewing the above description.

In this document, the terms "a" or "an" are used, as is common in patent documents, to include one or more than one, independent of any other instances or usages of "at least one" or "one or more." In this document, the term "or" is used to refer to a nonexclusive or, such that "A or B" includes "A but not B," "B but not A," and "A and B," unless otherwise indicated. In the appended claims, the terms "including" and "in which" are used as the plain-English equivalents of the respective terms "comprising" and "wherein." Also, in the following claims, the terms "including" and "comprising" are open-ended; that is, a system, device, article, or process that includes elements in addition to those listed after such a term in a claim is still deemed to fall within the scope of that claim.

What is claimed is:

1. A system comprising:
   at least one hardware processor; and
   at least one memory storing instructions that cause the at least one hardware processor to perform operations comprising:
   generating a pruning index for a source table organized into a set of batch units, the source table comprising a column of semi-structured data, the pruning index comprising a set of filters that index distinct values in each column of the source table, the generating of the pruning index comprising:
   accessing a reassembly hook object corresponding to a first portion of the semi-structured data that is subcolumnarized, the reassembly hook comprising a first data structure that represents the first portion of the semi-structured data;
   traversing the reassembly hook object to identify a first set of values corresponding to the first portion of the semi-structured data;
   accessing a residual object corresponding to a second portion of the semi-structured data that is not subcolumnarized, the residual object comprising a second data structure that represents at least a portion of the second portion of the semi-structured data;
   traversing the residual object to identify a second set of values corresponding to the second portion of the semi-structured data; and
   storing the pruning index with an association with the source table.

2. The system of claim 1, wherein:
   the first portion of the semi-structured data comprises a subcolumnarized path; and
   the first data structure comprises a tree structure, the tree structure including a root node and a primitive node corresponding to the subcolumnarized path, the primitive node comprising a pointer to one or more primitive values for the subcolumnarized path.

3. The system of claim 1, wherein the first portion of the semi-structured data that is subcolumnarized is stored in a columnar form within the column.

4. The system of claim 1, wherein the generating of the pruning index further comprises generating a filter for the pruning index based on a value from the first set of values or the second set of values.

5. The system of claim 1, wherein the generating of the pruning index further comprises generating one or more indexing transformations based on a value from the first set of values or the second set of values.

6. The system of claim 5, wherein the generating of the pruning index further comprises:
generating a set of fingerprints for the value based on the one or more indexing transformations; and
populating a filter in the set of filters with the set of fingerprints.

7. The system of claim 6, wherein the generating of the set of fingerprints for the value comprises generating a fingerprint for the value by computing a hash based on an indexing transformation for the value.

8. The system of claim 6, wherein the generating of the one or more indexing transformations comprises converting the value to one or more stored data types.

9. The system of claim 8, wherein the converting of the value to one or more stored data types comprises executing a cast function on the value.

10. The system of claim 5, wherein generating the one or more indexing transformations comprises:
attempting to convert the value to a stored data type; and
in response to a failed attempt to convert the value, storing an indicator that values in the column are unable to be converted to the stored data type.

11. The system of claim 5, wherein generating the one or more indexing transformations comprises:
attempting to convert the value to a stored data type; and
in response to a successful attempt, saving a result as an indexing transformation for the object.

12. The system of claim 6, wherein the operations further comprise:
receiving a query including a predicate directed at the column;
generating one or more indexing transformations based on a value in the predicate;
generating a set of search fingerprints based on the one or more indexing transformations;
pruning the set of batch units to scan for data matching the predicate using the pruning index and the set of search fingerprints; and
processing the query by scanning a subset of batch units resulting from pruning the set of batch units.

13. A method comprising:
generating, by one or more hardware processors, a pruning index for a source table organized into a set of batch units, the source table comprising a column of semi-structured data, the pruning index comprising a set of filters that index distinct values in each column of the source table, the generating of the pruning index comprising:
accessing a reassembly hook object corresponding to a first portion of the semi-structured data that is subcolumnarized, the reassembly hook comprising a first data structure that represents the first portion of the semi-structured data;
traversing the reassembly hook object to identify a first set of values corresponding to the first portion of the semi-structured data;
accessing a residual object corresponding to a second portion of the semi-structured data that is not subcolumnarized, the residual object comprising a second data structure that represents at least a portion of the second portion of the semi-structured data;
traversing the residual object to identify a second set of values corresponding to the second portion of the semi-structured data; and
storing the pruning index with an association with the source table.

14. The method of claim 13, wherein:
the first portion of the semi-structured data comprises a subcolumnarized path; and
the first data structure comprises a tree structure, the tree structure including a root node and a primitive node corresponding to the subcolumnarized path, the primitive node comprising a pointer to one or more primitive values for the subcolumnarized path.

15. The method of claim 13, wherein the first portion of the semi-structured data that is subcolumnarized is stored in a columnar form within the column.

16. The method of claim 13, wherein the generating of the pruning index further comprises generating a filter for the pruning index based on a value from the first set of values or the second set of values.

17. The method of claim 13, wherein the generating of the pruning index further comprises generating one or more indexing transformations based on a value from the first set of values or the second set of values.

18. The method of claim 17, wherein the generating of the pruning index further comprises:
generating a set of fingerprints for the value based on the one or more indexing transformations; and
populating a filter in the set of filters with the set of fingerprints.

19. The method of claim 18, wherein the generating of the set of fingerprints for the value comprises generating a fingerprint for the value by computing a hash based on an indexing transformation for the value.

20. The method of claim 19, wherein the generating of the one or more indexing transformations comprises converting the value to one or more stored data types.

21. A computer-storage medium comprising instructions that, when executed by one or more processors of a machine, configure the machine to perform operations comprising:
generating, by one or more hardware processors, a pruning index for a source table organized into a set of batch units, the source table comprising a column of semi-structured data, the pruning index comprising a set of filters that index distinct values in each column of the source table, the generating of the pruning index comprising:
accessing a reassembly hook object corresponding to a first portion of the semi-structured data that is subcolumnarized, the reassembly hook comprising a first data structure that represents the first portion of the semi-structured data;
traversing the reassembly hook object to identify a first set of values corresponding to the first portion of the semi-structured data;
accessing a residual object corresponding to a second portion of the semi-structured data that is not subcolumnarized, the residual object comprising a second data structure that represents at least a portion of the second portion of the semi-structured data;
traversing the residual object to identify a second set of values corresponding to the second portion of the semi-structured data; and
storing the pruning index with an association with the source table.

22. The computer-storage medium of claim 21, wherein:
the first portion of the semi-structured data comprises a subcolumnarized path; and
the first data structure comprises a tree structure, the tree structure including a root node and a primitive node corresponding to the subcolumnarized path, the primitive node comprising a pointer to one or more primitive values for the subcolumnarized path.

23. The computer-storage medium of claim 21, wherein the first portion of the semi-structured data that is subcolumnarized is stored in a columnar form within the column.

24. The computer-storage medium of claim 21, wherein the generating of the pruning index further comprises generating a filter for the pruning index based on a value from the first set of values or the second set of values.

25. The computer-storage medium of claim 21, wherein the generating of the pruning index further comprises generating one or more indexing transformations based on a value from the first set of values or the second set of values.

26. The computer-storage medium of claim 25, further comprising generating a set of fingerprints for the value based on the one or more indexing transformations, wherein the generating of the pruning index further comprises populating a filter in the set of filters with the set of fingerprints.

27. The computer-storage medium of claim 26, wherein the generating of the set of fingerprints for the value comprises generating a fingerprint for the value by computing a hash based on an indexing transformation for the value.

28. The computer-storage medium of claim 25, wherein the generating of the one or more indexing transformations comprises converting the value to one or more stored data types.

29. The computer-storage medium of claim 25, wherein generating the one or more indexing transformations comprises:
    attempting to convert the value to a stored data type; and
    in response to a failed attempt to convert the value, storing an indicator that values in the column are unable to be converted to the stored data type.

30. The computer-storage medium of claim 25, wherein generating the one or more indexing transformations comprises:
    attempting to convert the value to a stored data type; and
    in response to a successful attempt, saving a result as an indexing transformation for the object.

* * * * *

UNITED STATES PATENT AND TRADEMARK OFFICE
CERTIFICATE OF CORRECTION

PATENT NO. : 11,567,939 B2
APPLICATION NO. : 17/814110
DATED : January 31, 2023
INVENTOR(S) : Allahverdiyev et al.

Page 1 of 1

It is certified that error appears in the above-identified patent and that said Letters Patent is hereby corrected as shown below:

On the Title Page

On page 3, in Column 2, Item (56) under "Other Publications", Line 40, delete "14/394,149" and insert --17/394,149-- therefor Signed and Sealed this
Sixth Day of February, 2024

Katherine Kelly Vidal
*Director of the United States Patent and Trademark Office*